United States Patent [19]
Best

[11] Patent Number: 5,768,768
[45] Date of Patent: *Jun. 23, 1998

[54] APPARATUS FOR PROCESSING SMALL PARTS UTILIZING A ROBOT AND AN ARRAY OF TOOLS MOUNTED ON THE OUTER ROBOT ARM

[76] Inventor: Norman D. Best, 63 Glenflow Ct., Glendale, Calif. 91206

[*] Notice: The portion of the term of this patent subsequent to May 3, 2014, has been disclaimed.

[21] Appl. No.: 606,397

[22] Filed: Feb. 23, 1996

Related U.S. Application Data

[63] Continuation of Ser. No. 237,301, May 3, 1994, Pat. No. 5,515,599.
[51] Int. Cl.⁶ ...................................................... B23P 19/00
[52] U.S. Cl. ............................... 29/792; 29/799; 29/33 J; 29/35.5; 29/38 A; 901/30
[58] Field of Search .................................... 29/33 J, 33 R, 29/35.5, 38 A, 38 B, 38 C, 38 R, 791, 792, 799; 408/35; 901/30, 40, 41

[56] References Cited

U.S. PATENT DOCUMENTS

| | | |
|---|---|---|
| 4,438,309 | 3/1984 | Zimmer . |
| 4,740,133 | 4/1988 | Kawano . |
| 4,741,078 | 5/1988 | Kimura . |
| 4,880,265 | 11/1989 | Drexel et al. . |
| 4,995,148 | 2/1991 | Bonomi et al. . |
| 5,097,577 | 3/1992 | Buzzi et al. ............................. 29/38 A |
| 5,515,599 | 5/1996 | Best ......................................... 29/705 |

FOREIGN PATENT DOCUMENTS

| | | | |
|---|---|---|---|
| 1-281829 | 11/1989 | Japan ...................................... 29/705 |

*Primary Examiner*—David P. Bryant
*Attorney, Agent, or Firm*—Thomas I. Rozsa; Tony D. Chen

[57] ABSTRACT

The present invention is a method and apparatus for processing a plurality of small work-pieces which each weighs under five pounds using a robot gripping a rotatable pallet for holding an array of small parts. The robot has a removable tooling plate mounted on its head for mounting an array of processing tools operating on the rotatable pallet such as pick-and-place tools, work-piece ejection tools, vertical and horizontal video cameras, reflective photocell sensors, and laser distance ranging sensors. The tools operate under control of the robot and in conjunction with rotation and elevation of the rotatable pallet with respect to the tool array. The tools are mounted by an interchangeable, standard bracket to permit quick installation or removal of the tool mounting plate and addition or placement of individual devices and sensors appropriate to particular robotic tasks.

3 Claims, 11 Drawing Sheets

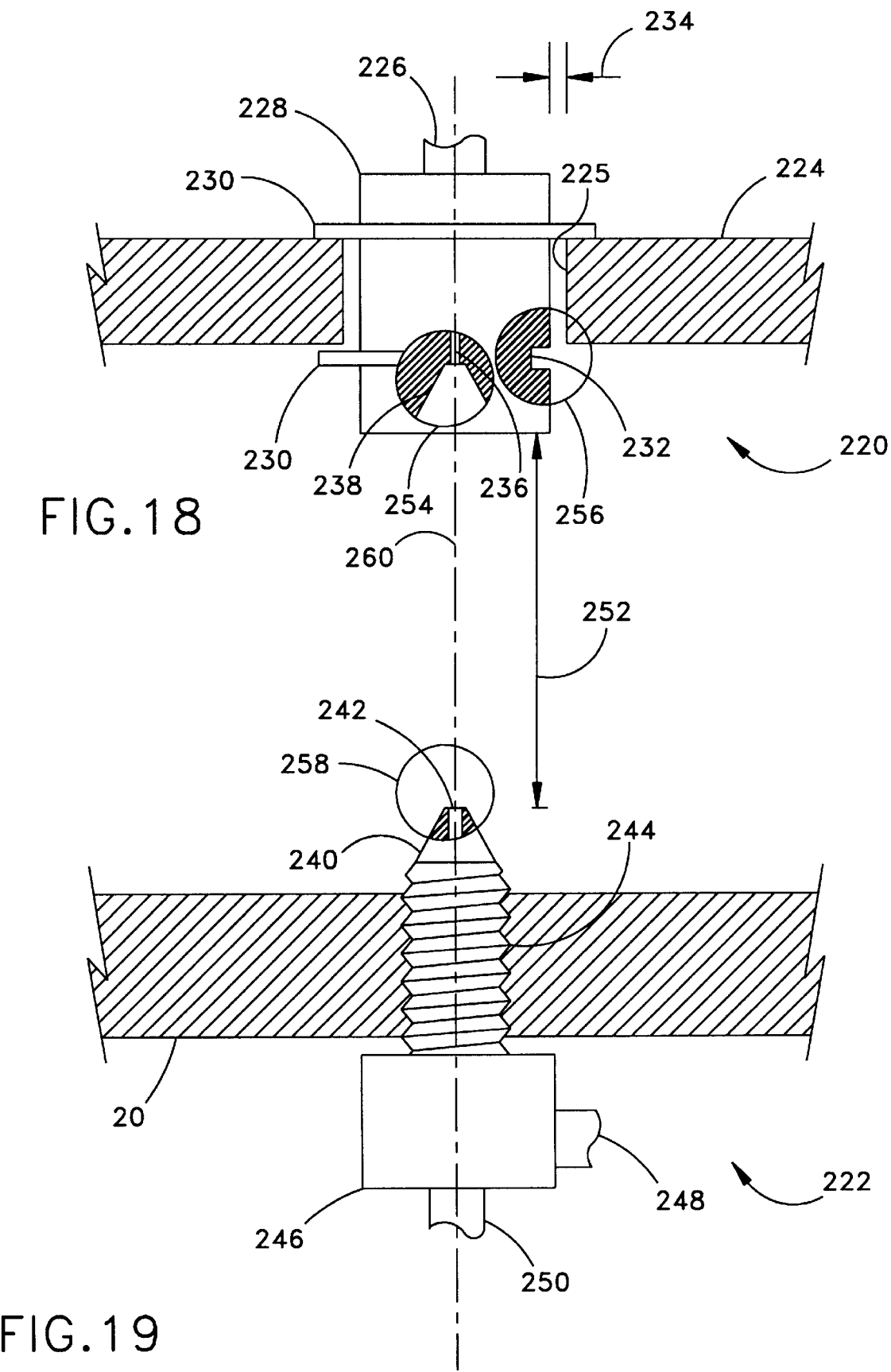

APPARATUS FOR PROCESSING SMALL PARTS UTILIZING A ROBOT AND AN ARRAY OF TOOLS MOUNTED ON THE OUTER ROBOT ARM

This patent application is a Continuation of patent application Ser. No. 08/237,301 filed on May 3, 1994, now U.S. Pat. No. 5,515,599.

BACKGROUND OF THE INVENTION

1. Field of The Invention

The present invention relates to the field of utilizing a robot to process and assemble small work-pieces having small parts or components while in a pallet held by the robot end effector. More particularly, the present invention relates to how processing tools may be advantageously fixed to the last arm of the robot while the end effector can rotate with respect to the robot arm. Most particularly, the present invention is highly advantageous when arrays of parts are held on the end effector in rotatable pallets which are rotated and moved vertically with respect to the sensors and devices fixed to the robot arm.

The present invention permits the robot to accomplish tasks by passing the work-pieces in front of the sensors and devices that are commonly needed for robotic processing tasks as soon as the pallet is picked up, during transit to a work-station, as part of the actions of the work-station, and prior to setting the pallet back down upon completion of the tasks.

2. Description of the Prior Art

Since the term part can be highly confusing in the following text, the term "work-piece" is defined as a part that is being worked on by the robot, or a component of such a work-piece or a smaller pallet that retains a work-piece. In the art of automatic assembly and processing equipment, a nest is something that retains a work-piece. The nest can be a simple hole, a machined, fitted block of material, or a more complex device including devices which wedge or hold the work-piece. Grippers are devices which actively hold the work-piece and typically permit the work-piece to fall when the grip is released. Selective compliance articulated robot arm (SCARA) robots are a class of industrial assembly robots that may hold a work-piece rigidly in the Z axis (vertical) while permitting the robot arm to move easily in the horizontal X and Y directions.

Commonly in automatic assembly and processing machines, as soon as a work-piece is placed on an assembly, the gripper moving the work-piece confirms that a work-piece was gripped by means of a sensor in the gripper, or at the next operating station at which a photocell verifies the presence or condition of the assembly. Such sensing is necessary to enable the machine to stop when incomplete or defective assemblies are being made at high speed. In prior art robotic processing modes, the robot is primarily used as a programmable pick-and-place between a supply of components and an assembly or to use the robot to move a single or multiple-headed tool about a work-piece. These robots have gripper sensors to verify successful gripping and placement of parts.

A very common SCARA robot used for industrial small parts assembly is disclosed in U.S. Pat. No. 4,702,668 issued to Carlisle et al. on Oct. 27, 1982 (hereafter "the Carlisle Patent"), which is available commercially as the Adept One robot.

It is common in the art to have a CCD camera mounted on the end of the last arm of the robot and by having the robot arm move the camera to an advantageous position to precisely locate a work-piece not then held by the robot in preparation for pick up by the robot, or to verify the correct positioning of a work-piece previously placed by the robot.

The following prior art references are relevant to the field of the present invention.

1. U.S. Pat. No. 4,741,078 issued to Kimura on May 3, 1988 for "Multi-Function Industrial Robot" (hereafter "the Kimura Patent").
2. U.S. Pat. No. 4,438,309 issued to Zimmer on Mar. 20, 1984 for "Tool Holder For Manipulator Arm" (hereafter "the Zimmer Patent").
3. U.S. Pat. No. 4,740,133 issued to Kawano on Apr. 26, 1988 for "Composite Working Device Using A Robot And Method Of Accomplishing Composite Work Using A Robot" (hereafter "the Kawano Patent").
4. U.S. Pat. No. 4,880,265 issued to Drexel et al. on Nov. 14, 1989 for "Robot Arm With An Assembly Flange For Tools" (hereafter "the Drexel Patent").
5. U.S. Pat. No. 4,995,148 issued to Bonomi et al. on Feb. 26, 1991 for "Robotically Controlled Multi-Task End Effector" (hereafter "the Bonomi Patent").

The Kimura Patent discloses a tool carrier which rotates 45° off the vertical axis so that only the tool directly below the robot head is in use. The Kimura Patent permits a robot to utilize several different small tools, but only one small tool at a time and not while it also carries the work-pieces on which it is operating. The robot is of a special, dedicated design atypical of SCARA robots. The tool carrier is not removable as an assembly, but individual tools are removable.

The Zimmer Patent discloses a tool holder. The tool holder is a working tip of the end effector, which in this case is a spot welding tip. The spot welding tip is mounted on the end effector and is driven by a bevel gear to rotate about a horizontal axis. Rotating a central meshing bevel gear causes the welding tip to rotate in the transverse (horizontal) axis so that the tip can be pointed at any angle with respect to the end effector. The novel part is the arrangement for commutation of electrical power and cooling fluids through the tips which is accomplished by contactor shoes bearing on a cylindrical surface fixed to the robot end effector. As the end effector is rotated 360° about a vertical axis, the commutator also rotates. Flexible electrical cables connect the tool holder to the commutator ring to permit the rotation about the transverse axis.

The Kawano Patent discloses a large 6-axis welding robot welding automobile doors. It includes a spot welding head and a first joint member in the form of a hook that is used to move a fixture holding the semi-complete door in a tooling frame to different stations. The hook is simply a parallel tool on the end effector. The hook is used to move the work, but not when the robot is welding on it.

The Drexel Patent discloses a flange mounted between the robot end effector and a primary tool in line with the robot wrist. Additional tools can be mounted to the end effector on each of the four sides. The robot would use one and then use the other. The robot moves the tool, not the work.

The Bonomi Patent discloses two 6-axis robots which cooperate together to drive rivets in aircraft panels without releasing their pressure on the panels. The robot end effector on the left provides the backup to the rivet insertion operations. The robot end effector on the right has a central quill that can be driven and rotated. The tools are carried in the linear apparatus which is moved across in front of the quill as necessary to complete all of the drilling and riveting operations.

In all prior art cases, the robot was being used more efficiently in the prior art modes of either picking up and placing a part or in using a tool then acting directly under the wrist axis of the robot to perform work on work-pieces not supported by the robotic head.

A co-pending patent application, Ser. No. 08/189,118 filed on Jan. 26, 1994 by the same inventor (hereafter "the '118 Application"), discloses a method and apparatus for processing and assembly of small work-pieces utilizing a robot wherein the work-pieces are held in nests which are primarily in circular arrays on a rotatable pallet that the robot grips, rotates, elevates and lowers while it moves the pallet through a plurality of processing stations. The '118 Application created a situation wherein the present invention could be used for further improving the speed of robots assembling small parts while reducing the cost and complexity of the robotic processing cell. The work-piece arrays of the '118 Application can also be linear arrays of work-pieces arranged on straight sides of the rotatable pallet. The work-pieces on the rotatable pallets can be pallets containing linear arrays, or lead frames containing linear arrays.

As used in Japan, the term robot includes a wide variety of devices such as simple pneumatic pick-and-place with mechanical end stops. It may also be applied to dedicated machines having an operating head with a vertical stroke and separately able to move work-pieces in the X and Y directions relative to the head by means such as linear and crossed-axis, motor driven slides.

The disadvantages with the prior art devices are that the tools on the robot head move with the end effector and no tools are provided for working on the work-pieces while they are being held and moved by the end effector. The '118 Application rotatable pallet carries small parts away from the centerline mechanisms of the robot head now enabling useful work to be performed by tools on the robot head at work-stations arrayed around the robot work-envelope and during transit between the work-stations.

SUMMARY OF THE INVENTION

The present invention is a method and apparatus for processing small parts utilizing a robot and an array of tools mounted on the outer arm of the robot.

It is the intent of the present invention to include robots with electronically controlled linked or crossed movable arms, such as a SCARA, gantry and Cartesian robots, with a head movable in the horizontal plane, a wrist joint capable of rotating the end effector with respect to the previous joint, and means to raise and lower the end effector in the Z direction either by solely moving the end effector vertically or by elevating at least one of the arms supporting the end effector.

In the present invention, the head of the robot is understood to be the last joint of the robot that may be stationary when only the end effector is moving. It is the relative motion of the end effector to that joint that is used in the present invention to accomplish useful work.

The X, Y, and Z directions are defined in robot coordinate directions being normally coincident with world coordinates in most situations. The up and down directions are defined relative to decreasing or increasing the distance between the tooling plate and the end effector.

It is the primary objective of this invention to increase the speed and efficiency of the robotic processing and assembly of small parts; more particularly, when a robot carries a plurality of work-pieces in a circular array on a pallet.

It is another object of the present invention to provide selected operating tools commonly needed for processing and assembling small parts on the head of a robot carrying a rotatable pallet of small parts so that the tools can be used as soon as the robot has gripped the pallet. Therefore, the tools can be utilized repeatedly during the processing without the robot having to return to a previous work station.

It is another object of the present invention to increase the time, cost, space efficiency and to permit the robotic cell to accomplish even more tasks requiring only changes to the robot program.

It is another object of the present invention to utilize primarily SCARA robots with X, Y, and Z motions of the end effector and rotary wrist motions, such as the Adept One robot.

It is another object of the present invention to utilize cylindrical coordinate robots such as the Seiko RT 3200 robot and Cartesian axis robots such as the Seiko XM 5106 robot.

It is another object of the present invention to utilize a tooling plate in a high volume application using a pallet conveyor and a simpler robotic device.

The tools are positioned approximately on the centerline of the work-piece nests which are in the rotatable pallet so that the robot end effector rotating the pallet can present any work-piece in the array to a particular sensor or tool. In those prior art robots where the end effector also moves vertically with respect to such tools fixed to the last arm, more advantageous operations can be performed such as using reflective photocells to sense the presence and position of work-pieces in the rotatable pallets, picking and placing of parts onto and off of the rotatable pallet, or having laser distance ranging sensors on the arm to precisely determine the height of the assemblies.

Therefore, rather than having the robot move the work-pieces between operating stations, the tools on the tooling plate can operate on the work-pieces on the rotatable pallets so that the head of the robot becomes a small machine in itself.

The work-pieces can be individual assemblies handled in circular arrays, or the work-pieces can be in linear arrays and carried on a sub-pallet or connected together by skeletons or lead frames in linear arrays such as in the processing of integrated circuits.

As previously described, automatic machinery must usually verify that a work-piece placement or processing operation was successful before the next assembly operation can began. When the robot first picks up the rotatable array of work-pieces, it may need to determine which pallet it has gripped and whether all the work-pieces are correctly in the pallet. By bringing the pallet up to the tooling head and rotating it with respect to the tools on the tooling plate, a bar code read head pointed down at the top of the tooling plate can read the pallet identity and the product bar codes while simultaneously a reflective photocell can check for presence of work-pieces in all of the nests on the pallet. A robot may be able to rotate such a circular pallet with 24 work-pieces to a full 360° in less than two seconds while also reading the pallet bar codes. The reflective photocell requires five (5) milliseconds to confirm that a single work-piece is presented on the pallet. Therefore, by the time the robot has moved from picking up the pallet and moved to the first robotic work-station, the necessary preliminary data has already been obtained.

The '118 Application has disclosed a rotatable pallet robotic work cell with a large number of work-stations distributed around the working envelope of the robot. By providing the most common tooling functions mounted on the head of the robot, costs of repeating sensing functions are eliminated and the work envelope is available for more specialized functions. Also, the tools on the tooling plate are available for work even while still performing work at the work station and without the robot arm having to frequently return to a check station or similar function.

The primary cost of a machine vision system is the central processor and the associated software. The cost of additional cameras, lenses, brackets, and lighting is relatively inexpensive. Several machine vision video cameras can be mounted on the tooling plate and can perform a large number of check functions for a large variety of work-pieces. With the video camera pointed downwardly and the robot end effector being able to move vertically with respect to the tooling plate, the focal point on the work-piece can be adjusted advantageously according to the processing then needed.

By having the robot head carry such an array of tools directly over the work-piece array, the common processing tools are immediately available to begin work rather than requiring the robot head to move to another location where such a tool is positioned.

By having the robot rotate and move the pallet relative to a simple vertical air cylinder, one of the most common functions in automation, to pick-and-place a work-piece can be dramatically reduced in cost, complexity, and size while using the same device to load and unload a variety of parts from the pallet. This very common capability is unique to the present invention because of its simplicity.

The tools are mounted on brackets and secured to a tooling plate fixed to the head of the robot. The tooling plate is easily added or removed, and individual tools added or removed on the robot head to enable rapid changing of tool arrays depending on the work-pieces being processed.

The tooling plate has a circular array of perhaps twenty-four (24) positions for fixing tooling brackets in a common way so that a particular tool can be mounted at any of the twenty-four (24) positions. The tooling plate has, for example, four (4) tooling positions reserved for other functions, for a net of twenty (20) possible tool mounting positions. An array of standardized tools and bracketry will be available to minimize costs.

Prior art robots have not used such tool arrays because the work-pieces were directly under the robot head and the end effector. The robot did not attempt to work on the work-pieces during transit, other than to perform simple tasks like centering a work-piece within a multi-jawed gripper,. By using a pallet to support an array of work-pieces and moving these work-pieces radially outward, the present invention enables the tooling plate and set of tools of the present invention to be used in conjunction with each other.

The present invention method and apparatus for processing small parts utilizing a robot and an array of tools mounted on the outer robot arm decreases the cost and increases the speed of certain robotic cells for processing small work-pieces.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 18 is a partial cross-sectional view of a female connector which is mounted through the tooling plate and permitted to move laterally in mating with a male connector on the rotatable pallet, for applying air, liquid, and fiber optic connections to selected nests.

FIG. 19 is a partial cross-sectional view of a fixed male connector which is mounted through the rotating pallet at a nest and mates with the female connector in FIG. 18.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The detailed embodiment of the present invention will be presented first followed by other embodiments within the scope of the present invention which will then be described.

The preferred embodiment of the present invention is illustrated with an Adept One robot of the current design according to the Carlisle Patent. After nearly ten years of sales, it has become one of the most commonly used robots in manufacturing in the United States. The '118 Application has disclosed how using the robot to carry a circular array of work-pieces can increase the robot efficiency while permitting access to many operating work-stations located at the periphery of the robot work envelope. The objective of the '118 Application and the present invention is to more fully utilize the unique qualities of existing assembly robots to perform far more assembly and processing tasks on highly variable small work-pieces in less time.

If all processing and check functions only existed at work-stations at the periphery of the work envelope, then the robot would have to repeatedly move back to such a station during the course of the work-piece processing, or each capability would have to be repeated at each work-station where it was needed. The present invention places some common functions directly on the outer arm of the robot where the robot can operate on the work-pieces even while the pallet is still in the work-station. Other functions such as reading the pallet and product identity bar codes are then easily added and can then be accomplished even while the robot is moving between work-stations.

The present invention includes using the robot to actively assist the operation of such tooling devices, further simplifying the devices.

Generally, the work-pieces are not shown in work-piece nests since they may actually be in a wide variety of configurations. For illustration purposes, it may be assumed that work-pieces are short cylinders which are partially inserted into nests of the rotatable pallet.

Figure 1:
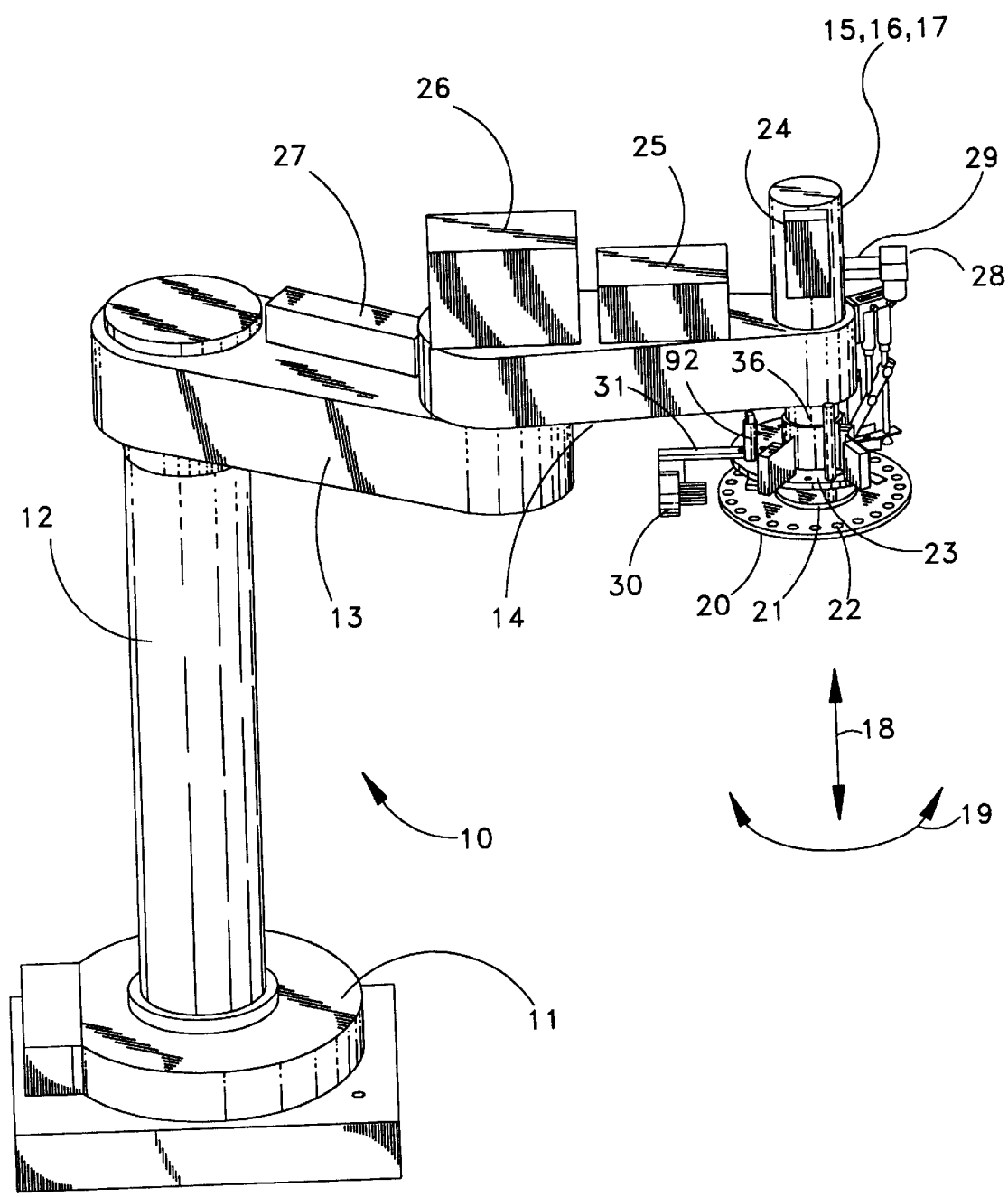
FIG. 1 is a perspective view of a robot which utilizes the present invention method and apparatus for retaining a plurality of processing tools.

Referring to FIG. 1, there is illustrated an Adept One robot 10 of the SCARA type suitable for industrial manufacturing of small work-pieces. The robot 10 consists of a base 11 which is mounted to a vertical column 12. An inner link arm 13 is rotated about the top of vertical column 12. An outer link arm 14 is rotated about the outer end of inner link arm 13. A robot quill mechanism 15 is not visibly shown in these figures, but is shown in detail in the Carlisle Patent, sheet 6 of the drawings. The robot quill 15 can be moved both vertically and rotationally with respect to the end of the outer link arm 14 and carries a user flange 17 (shown in the Carlisle Patent, sheet 6 of the drawings, which is at the bottom of reference number 110) for mounting end effectors. The quill mechanism 15 is covered by a quill cover 16. The robot 10 moves the quill 15 in a vertical stroke and rotationally as shown by the arrows 18 and 19 respectively. The lower end of the quill mechanism 15 is supported by a quill guide 36, which projects down from below the outer link arm 14.

Figure 3:
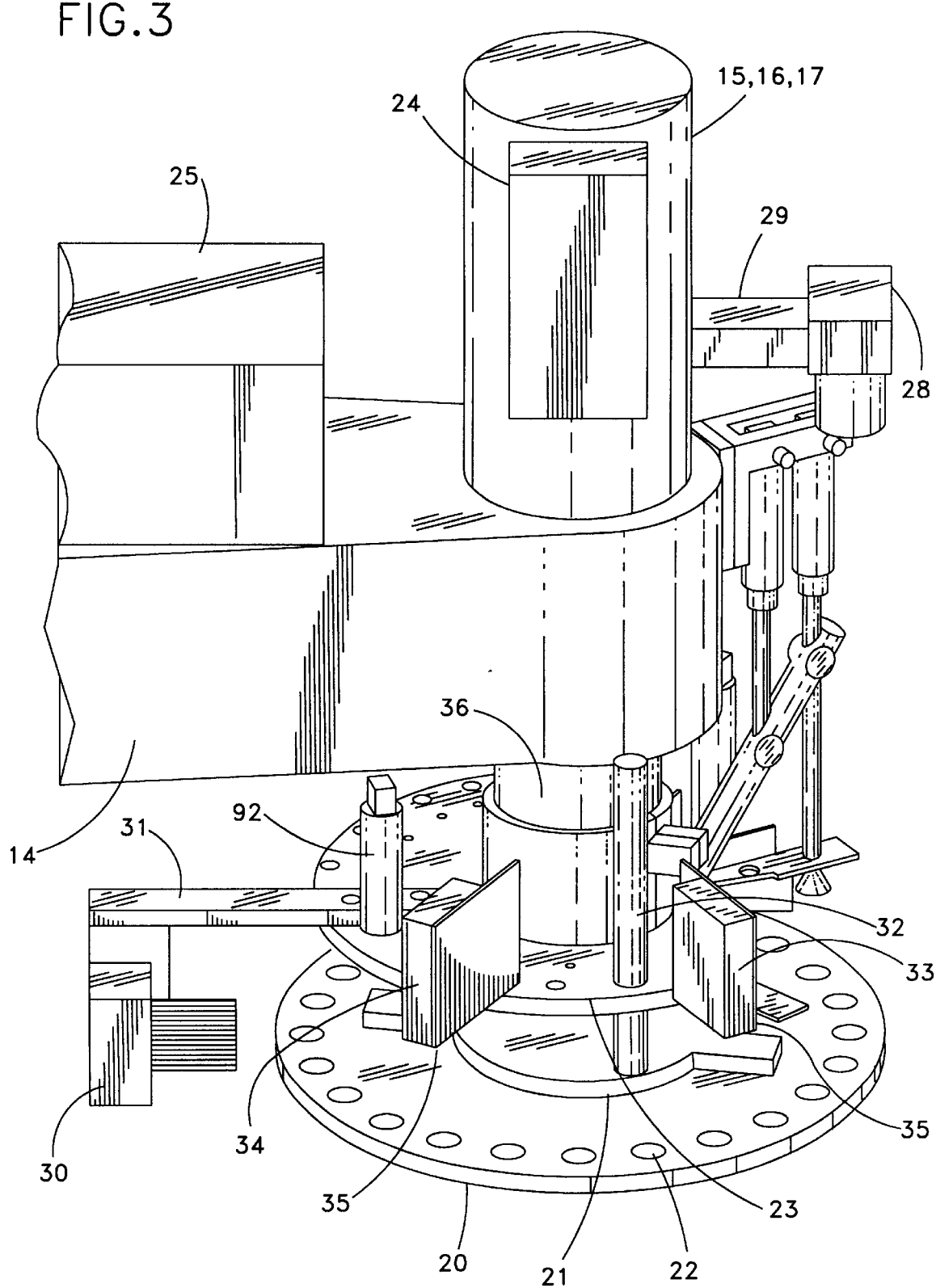
FIG. 3 is an enlarged perspective view of the robot arm and the tooling plate shown in FIG. 1.

Referring to FIGS. 1 and 3, an end effector is mounted to the user flange for the robot 10 to perform useful work. A pallet gripper 21 is attached to the user flange and grips a rotatable pallet 20. The pallet 20 contains a plurality of work-piece- nests 22 with twenty-three nests depicted (shown in FIG. 13). The twenty-fourth position is an enlarged opening for passing work-pieces vertically through the pallet 20. When the work-piece nests 22 are rotated into position in a work-station operating head at the outer periphery of the robot work envelope, they are directly under video camera 28 which is fixed to the quill cover 16 by a bracket 29. Such a machine vision camera mounting is common in the art for locating work-pieces prior to pickup or after depositing them, but is unique to the present invention for inspection of work-pieces then held and moved by the robot end effector.

For clarity in these figures, cabling, tubing, fiber optic cabling, and wiring are not illustrated, but are conventional in the art and would be easily accomplished by persons skilled in the art. To minimize such items, several supply manifolds are illustrated as being mounted on the robot arms. A pneumatic vacuum generator 24 is mounted to the side of the quill cover 16 for supplying vacuum to tools and to the end effector. A small pneumatic solenoid valve manifold 25 is located adjacent to the quill cover 16. When appropriate, a fiber optic light source 26 is mounted on the inside of the outer arm 14 because the fiber bundles are not then required to flex during normal robot operations. The light source supplies light for the tooling on the robot arm tooling plate 23 through branching of the fiber optic bundles as required. It may be advantageous for the light source 26 to be programmable for maximum application flexibility. On top of the inner link arm 13 is positioned an electronic control input/output interface 27 since such electrical wires are small and less susceptible to damage than the fiber optic cables or pneumatic lines. Mounting of such equipment is discouraged by the robot manufacturer in contemplation of very rapid movements on the robot arm, however, the '118 Application of a circular rotatable work-piece pallet dramatically reduces the movements required by the inner and outer link arms 13 and 14, and both can move much slower than normally necessary in small parts robotic assembly cells. This is especially true on the Adept One robot because the stroke 18 and rotation 19 of the quill 15 do not require movement of the inner and outer link arms 13 and 14.

Figure 4:
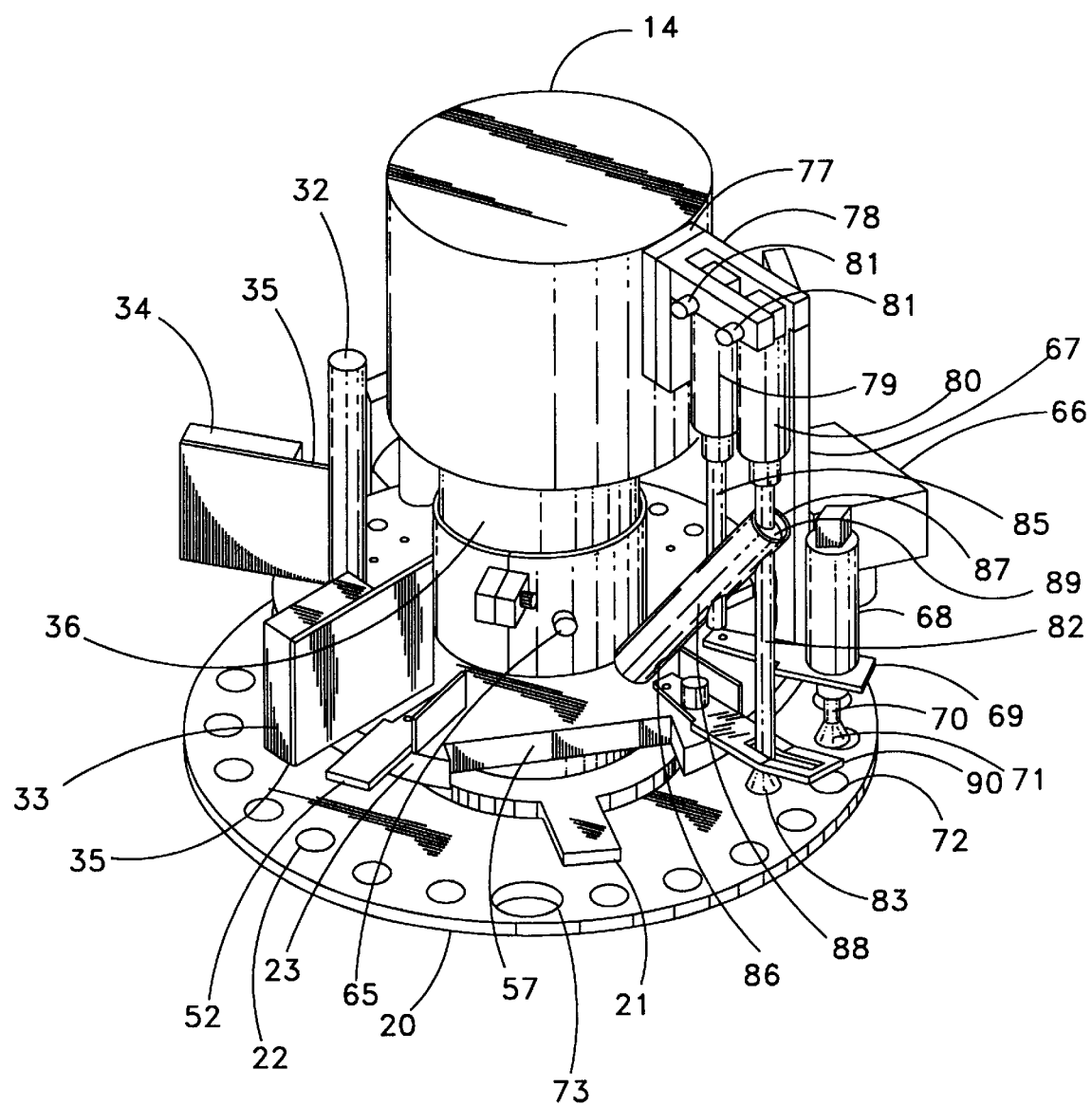
FIG. 4 is an enlarged perspective view of the tooling plate shown in FIG. 1.

Referring to FIGS. 3 and 4, according to the present invention, a tooling plate 23 is clamped to the quill guide 36 and on which are mounted various selected processing tools. Directly under the robot outer link arm 14, shown in FIG. 4 for clarity as only a round cylinder, is a video camera 30 mounted on a bracket 31 which is affixed to the tooling plate 23. Camera 30 is focused on the work-piece in nest 22 adjacent to the camera 30. By rotating the quill 15, the robot can successively present all the work-pieces or particular profile details on each work-piece in the pallet 20 to camera 30 for, measurement. By elevating and depressing the rotatable pallet 20 relative to camera 30, the vision system can make additional vertical measurements on the work-pieces. Camera 30 can also be fixed from a bracket directly down from the overhead arm.

Air cylinder actuator 92 at the inboard side of tooling plate 23 operates vertically to cause actions on work-piece nests such as making electrical tests or applying a pneumatic pressure probe to nests or nest grippers. The end of air cylinder actuator 92 can include a mechanical device that moves a mechanical device associated with each work-piece nest 22. Therefore, while there may be twenty-four (24)

work-piece nests on the rotatable pallet 20, the robot control system needs only a single control line to successively activate each nest. Further, it is then not necessary to pass that control down through the robot quill 15 and through a complex quick disconnect coupling to the rotatable pallet 20. Such an air cylinder actuator 92 can be mounted as shown in FIG. 3, or mounted on a bracket directly over the work-pieces nest. Actuator 92 is discussed later in more detail.

Other typical functional tools illustrated in FIG. 1 will be discussed in subsequent figures. The rotatable pallet 20 may be in any vertical position within the stroke 18 of the robot 10 during its operations and may only be momentarily and occasionally raised when advantageous to use the tools on the tooling plate 23 according to the present invention. The Adept One robot has a standard 7.7" stroke and an optional 12" stroke.

Figure 2:
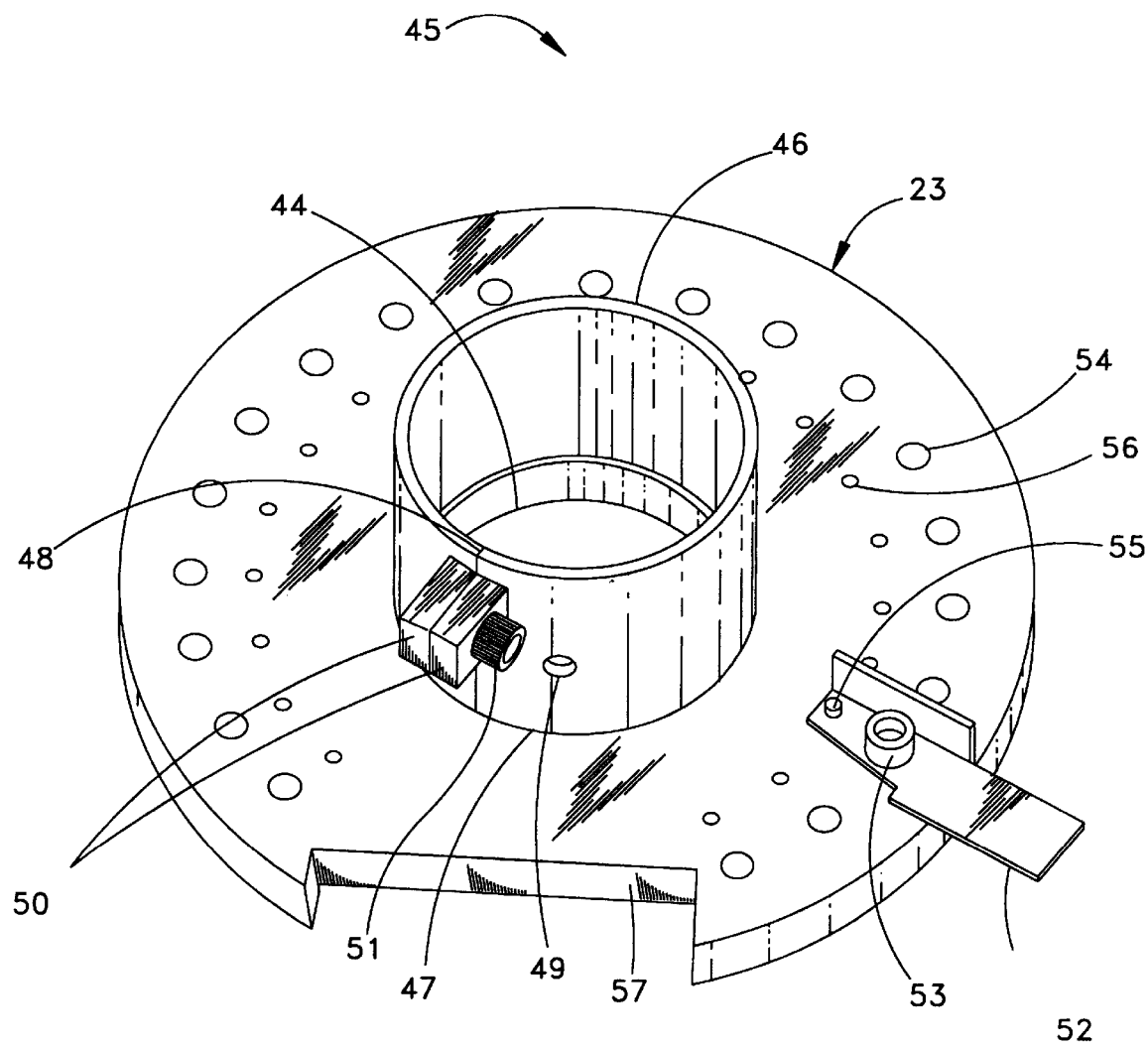
FIG. 2 is a perspective view of a tooling plate according to the present invention.

Referring to FIG. 2, there is depicted the apparatus of the present invention. The tooling plate assembly 45 consists of a circular tooling plate or disk 23 with a central hole 44. The tooling plate 23 also has an array of precision bolt holes 54 and precision dowel pin holes 56. Bracket 52 can be secured with a shoulder bolt 53 and located by a dowel pin 55. A plurality of brackets 52, shoulder bolts 53 and dowel pins 55 are used to mount an array of tools depending on the user's present needs. Bracket 52 is machined from standard angle stock to suit the mounting needs of various tools. The tooling plate 23 is installed upward onto the robot quill guide 36 by locating it, using a dowel pin hole 49, to a complementary matching hole in the quill guide 36 and then clamping it into position. The tooling plate 23 can be installed or removed with tools still attached to the tooling plate 23.

The tooling plate 23 has a closely fitting annular split ring or clamping tube 46 which is welded at joint 47 and having welded tightening blocks 50 also attached to it. By tightening a bolt 51, the closely fitting split ring 46 is securely fastened to the robot head. In some cases, more than one split,48 and set of tightening blocks 50 will be advantageous.

To minimize mass on the end of the robot outer link arm 14, the material of the tooling plate 23 is contemplated to be machined or investment cast aluminum with appropriate lightening relief below the tooling surface. The clamping tube 46 can extend down through the tooling plate 23 and be bonded by suitable adhesive means. Alternatively, the entire plate and clamp assembly could be injection molded fiberglass reinforced plastic.

The tooling plate 23 has an aperture 57 on the near side. The aperture 57 is rotationally located where the rotatable pallet array is presented to work-stations on the periphery of the working envelope of robot 10. The tooling plate 23 is cut away to provide a clear access to the work-pieces successively presented to the work-station by rotation of the pallet 20.

Referring to FIG. 3, there is illustrated a detail view of the tooling previously shown in FIG. 1. The robot vacuum pallet gripper 21 is attached to the user flange. This figure shows a reflective photo sensor 33, such as model No. SM312FP manufactured by the Banner Engineering Corporation of Minneapolis, Minn. mounted by a bracket 35 affixed to the tooling plate 23. The photo sensor 33 can sense work-piece presence in five (5) milliseconds and can verify the presence of work-pieces and mounted components as fast as the robot 10 can rotate the pallet 20. Since the photo sensor 33 is positioned over the path of the work-piece during rotation and can be vertically moved by the robot relative to the photo sensor 33, it can be used for other useful functions. Reflective photocells acting through small fiberoptic bundles and sensor tips can be readily positioned and fixed to the tooling plate 23.

Referring to FIG. 4, a laser distance ranging sensor 34, such as the LB series manufactured by the Keyence Corporation of America, Inc. of Torrance, Calif. is mounted in a similar bracket 35. The ranging sensor 34 can be useful for checking the presence and the height of work-piece assemblies. The laser ranging sensor 34 emits a downward beam of infrared light and then measures the time delay for reflected energy to be received to determine the precise distance from the object. A suitable laser sensor might cost approximately $1,600. Before the robot 10 has picked up a rotatable pallet 20, the laser ranging sensor 34 can also be used to roughly find the distance to the top pallet in a stack of such pallets. After the robot 10 has completed processing a rotatable pallet 20, by sighting through an aperture 73 on the pallet 20, the laser ranging sensor 34 can measure the approximate distance to the top pallet in the receiving stack of pallets. The laser ranging sensor 34 can also be used as a precision edge detector to verify correct location of work-pieces in the nests 22.

The laser range sensor and edge detector are part of a general class of devices that may be useful in selected circumstances. They do not need to touch the work-pieces but can operate from a distance. Other useful stand off sensors are infrared and visible light detectors.

A bar code cylindrical read head 32 is shown installed downwardly through the tooling plate 23 and focused on the top surface of the pallet 20. The read head 32 is used to read the pallet identity and product codes on the top of the rotatable pallet 20 as soon as the robot 10 picks up the pallet 20. The robot 10 begins rotating the pallet 20 to read the bar codes and to verify that all work-pieces are in position. Since the bar codes will be inboard from the work-piece nests, the read head 32 is installed directly through the tooling plate 23 in an appropriate position. To enable such reading, the two arms on the pallet gripper 21 will be shorter than those illustrated in the figure.

Referring to FIGS. 1 and 4, two tools are illustrated for picking work-pieces off from the pallet 20 or for putting components and work-pieces on pallet 20. Both functions are commonly needed in even the simplest assembly machines. These functions both demonstrate methods of utilizing the unique capabilities of robots to perform assembly and processing functions. A pneumatic air cylinder 68 is mounted vertically on a bracket 69 over a nest 72 in the pallet 20. On the end of air cylinder 68 is a work-piece gripper 71 which in this illustration is a simple vacuum cup. For clarity in the illustration, the vacuum line connections to the vacuum generator on the quill cover are not illustrated. The assembly will be hereafter be termed as a single cylinder picker 68. To remove a work-piece from the pallet 20, the robot 10 rotates the pallet 20 until the nest is in the position of nest 72. The robot 10 can then raise the pallet 20 so that the gripper 71 can grip the work-piece. The gripper 71 is activated by vacuum in this illustration and the robot 10 then lowers the pallet 20 away from the work-piece. The robot 10 then rotates the pallet 20 until the nest 73 is directly under the picker 68. Nest 73 is simply one of the twenty-four (24) original nest positions in which the nest aperture has been enlarged so that completed work-pieces can be moved vertically through the pallet 20 at that one position. Therefore, there are twenty-three (23) work-piece nests while there are twenty-four (24) nest positions. More than one such enlarged nest 73 can be located on pallet 20. With nest 73 under the gripper 71, the gripper 71 is released, permitting the work-piece to fall through nest 73. By repetition of this cycle, one, some, or all the work-pieces can be unloaded from the pallet 20. The vertical action of cylinder 68 was not necessary if the robot 10 can raise the pallet 20 so that the work-piece is against the gripper 71. The vertical action of cylinder 68 is required when the robot 10 cannot move the pallet 20 a sufficient distance vertically in direction 18 with respect to the robot outer arm 14 without contacting other tools.

The same picking function can be employed with the variation that extending the air cylinder 68 ensures that the robot 10 can always move the pallet 20 far enough vertically. Alternatively, the robot 10 can move the selected work-piece to position 72 where the air cylinder 68 acting through shaft extension 70 moves the gripper 71 down onto a work-piece and back up after gripping the work-piece.

The single air cylinder picker 68 can also be usefully employed in picking up work-pieces from trays of parts or feed tracks and placing the work-pieces and components into nests 22 or onto work-pieces in nests 22. For this action, the enlarged aperture 73 is rotated to be directly under the gripper 71, the cylinder 68 is extended causing gripper 71 to be extended through aperture 73 down below the lower surface of pallet 20 and onto the top of a work-piece waiting there. The gripper 71 is activated and the cylinder 68 is retracted, lifting the work-piece above the pallet 20. The robot 10 rotates the pallet 20 until the selected nest 22 is under the gripper 71. The robot 10 then raises the pallet 20 until the work-piece is in the selected nest 22 and then releases gripper 71, transferring the work-piece to the selected nest 22. The cylinder 68 may also be partially extended during the release of the work-piece. Because of the low cost of such a picker, several pickers may be located on the tooling plate 23 for different parts, or may work simultaneously on different work-pieces on the pallet 20.

To illustrate that even more complex pick and place functions can be fitted to the tooling plate 23, a two-cylinder pick and place is illustrated. Such a picker might be faster than the single cylinder picker because it does not require rotation of the pallet 20 to function, or might be used where the work-piece cannot be passed down through the aperture 73, or when work-pieces are fed in on inclined tracks which are common for electronic components. Since the mechanism is taller, it is secured to the robot outer arm 14 enclosure by a bracket 77 which is bonded to the outer arm 14. Bracket 78 is bolted to bracket 77 and supports the upper end of the two air cylinders 79 and 80 by means of pinion pins 81. Air cylinder 80 operates through extension shaft 82 which moves a vacuum gripper 83 vertically. Extension shaft 82 moves freely through a hole in the pivoting pin 89. Note that this tool as defined so far has all the capability of the single picker as described above. To move the gripper 83 outboard from the pallet 20, a second cylinder 79 acts through extension shaft 85 on pinion pin 88 and linkage tube 87. The shaft 85 is fixed to pinion pin 88 which is free to rotate within linkage tube 87. The lower end of the linkage tube 87 is held by another pinion pin 86 which is bolted through the tooling plate 23. When cylinder 79 is activated, pushing down on pinion 89, the cylinder 79 forces tube 87 to rotate clockwise about pinion 86 and the end pinion 88 to move down and outboard. This action forces cylinder extension 82 to rotate outboard guided by a slotted bracket 90. Therefore, the picker gripper 83 is moved outboard.

To remove work-pieces from the pallet 20 with the two cylinder picker tool, cylinder 80 is activated lowering gripper 83, the gripper 83 is activated, cylinder 80 is retracted, cylinder 79 is extended forcing gripper 83 outboard of the pallet 20. The gripper 83 is released, releasing the work-piece onto a track or work-piece container and cylinder 79 is then retracted.

To load work-pieces from supply points onto the pallet 20, the robot 10 moves into a favorable position, cylinder 79 is extended, swinging gripper 83 outboard. Cylinder 80 then extends to place the gripper 83 on the work-piece and the gripper 83 is activated. Cylinder 80 retracts and then cylinder 79 retracts swinging the gripper 83 and work-piece back over the pallet 20. Simultaneously, the robot 10 rotates pallet 20 to present a selected nest 22 under gripper 83. Cylinder 80 then extends placing the work-piece into the nest 22. The gripper 83 releases and cylinder 80 retracts.

For processing and assembly of medical work-pieces such as silicone intraocular lenses, it is mandatory to minimize particulate falling on the work-pieces. The rotatable pallet 20 might then have a circular dust cover with only a single aperture for working on the lenses. It is then necessary to hold the dust cover from rotating while the rotatable pallet 20 is successively turned to present successive work-pieces. The vertical air cylinder 92 is mounted inboard on the tooling plate 23, as shown in FIG. 3, and is then activated forcing a pin down into a matching hole in the dust cover and preventing the dust cover from turning during rotation of the pallet 20.

Other suitable pick and place tools for mounting to the tooling plate 23 but not illustrated by the drawings include a horizontally rotating actuator moving a vertical air cylinder with gripper into alignment with a nest and then rotating outboard. Another pick and place tool is a small compact non-rotating air cylinder which is mounted on the tooling plate 23 and moving a vertically oriented air cylinder and gripper over a nest 22 and then radially outboard of the pallet 20.

Orientation and positioning of the tools on the tooling plate 23 is a function of the work-pieces, tasks to be performed, and work-stations aligned on the periphery of the robot work envelope.

Concentric circular arrays of work-pieces are contemplated within the scope of the present invention. In such cases, the work-piece tools would be duplicated for each rank of parts while pallet tools such as the bar code reader head would not. The pick and place devices might then have individually activated tools over each row of work-pieces.

The industry of assembling for high speed dedicated assembly machines considers work-pieces as small if the assemblies can be held in a person's hand. The Adept One robot can move a payload of a gripper, pallet, and work-pieces weighing up to twenty (20) pounds on its user flange with a reach of 31.5" from the center of the column to the center of the user flange and would be suitable for such parts. However, the Adept Three robot is similar in respect to all major design features of the Adept One robot except that it can carry a payload of fifty-five (55) pounds and has a reach of 41.5" and would be suitable for work-pieces weighing up to five pounds, such as car radios and computer disk drives. to FIG. 5, there is illustrated a circular shaped tooling plate 95 which is utilized for the Adept One robot, as shown in FIG. 1. The Adept Three robot would have a much larger tooling plate than the Adept One robot while working on many more or much larger parts on a larger work-piece pallet.

While the circular design is optimal for circular arrays of work-pieces, linear arrays are contemplated for some industries such as integrated circuit packaging where the rotatable pallet might carry linear lead frames of multiple parts resting on two sides of a rectangular pallet, or four sides of a square pallet. In such cases, sensors such as reflective photocells might be multiplexed with the fiber optic end sensors arranged in a rank on one entire side of the square tooling pallet and picker devices might be on a horizontal bar moving a rank of vacuum grippers at a time rather than just one.

Figure 5:
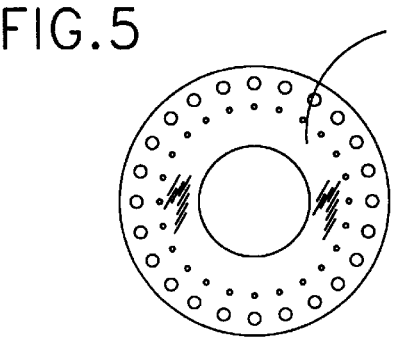
FIG. 5 is a top plan view of the preferred embodiment of the present invention showing a circular shaped tooling plate.
Figure 6:
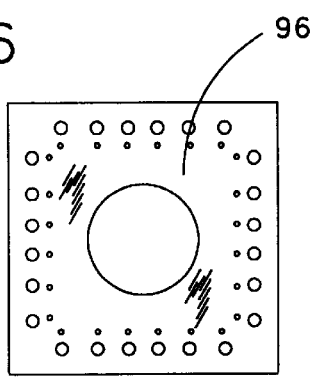
FIG. 6 is a top plan view of an alternative embodiment of the present invention showing a square shaped tooling plate.
Figure 7:
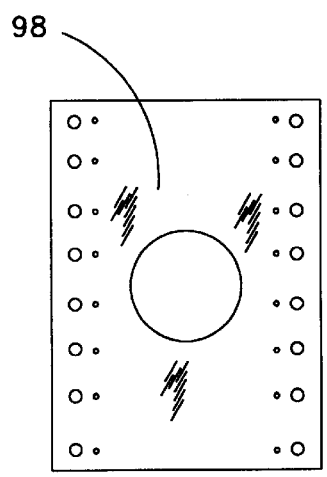
FIG. 7 is a top plan view of an alternative embodiment of the present invention showing a rectangular shaped tooling plate.
Figure 8:
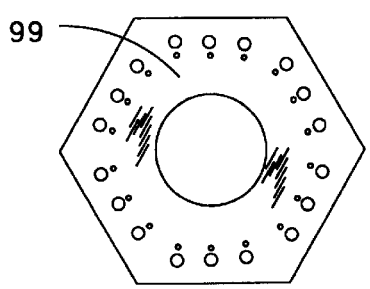
FIG. 8 is a top plan view of a further alternative embodiment of the present invention showing a hexagon shaped tooling plate.

Referring to FIGS. 6, 7, and 8, there are illustrated some variations for such linear arrays of work-pieces in the same scale as tooling plate 95, as shown in FIG. 5. FIG. 6 shows a square tooling pallet 96 suitable for working on lead frames with six work-pieces per lead frame arranged in a square pattern on a square pallet. FIG. 7 shows a rectangular tooling plate 98 suitable for working on two longer linear arrays. FIG. 8 shows a hexagonal tooling plate 99 suitable for working on shorter linear arrays of work-pieces such as when the work-piece pallet carries linear arrays of three parts each. Cartesian coordinate robots with linear motion axes and overhead gantry robots can be useful when operating on work-pieces such as linear arrays on pallets placed on the rotatable pallet.

It will be appreciated that the shapes are not limited to the above descriptions. It is emphasized that while the circular shaped tooling plate is the preferred embodiment, it is also within the spirit and scope of the present invention to have a polygon shaped tooling plate.

Figure 9:
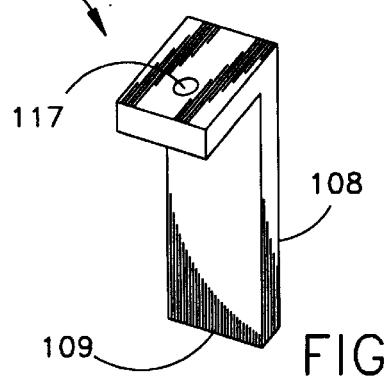
FIG. 9 is a perspective view of the preferred embodiment of the present invention showing a clamping tube assembly for attaching the tooling plate to the robotic arm.

The tooling plate, tools, and method of the present invention will be useful on other robots. FIG. 9 shows the preferred embodiment of the present invention clamping plate assembly previously shown in FIG. 2.

Figure 10:
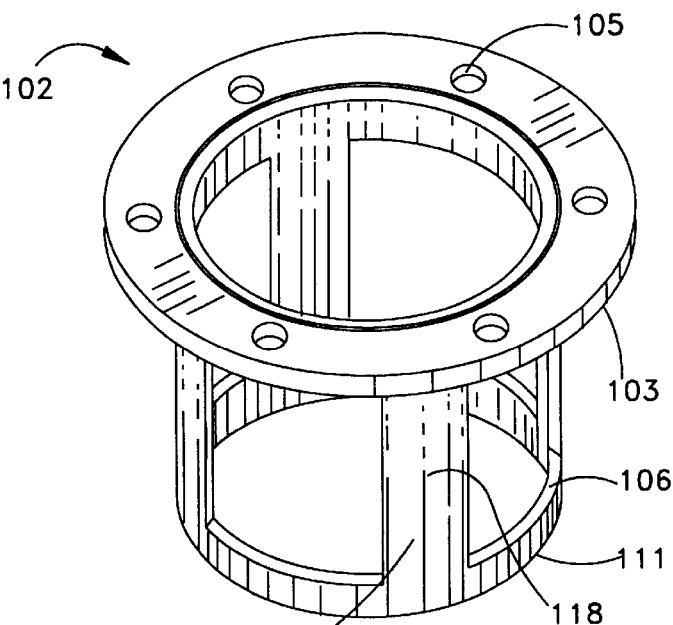
FIG. 10 is a perspective view of an alternative embodiment of the present invention showing a mounting means for attaching the tooling plate to the underside of an overhead robotic arm.

Referring to FIG. 10, there is shown a mounting means 102 suitable for mounting a tooling plate to the underside of an overhead robotic arm by bolts. The mounting means 102 consists of a bolting plate 103 which is affixed to a tube 104, with optional lightening apertures 106, and which is fixed at edge 111 to the tooling plate 23. The bolting plate 103 includes bolt holes 105 for mounting to the bottom of robot arm 14.

Figure 11:
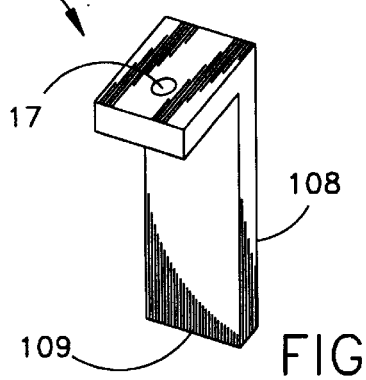
FIG. 11 is a perspective view of a bracket of which two or more would be utilized instead of the vertical tube shown in FIG. 10, for attaching the tooling plate to an adjacent robotic arm.

Referring to FIG. 11, a simple angular bracket 107 is shown which can be fixed to the tooling plate at edge 109 and includes a bolt hole 117 to be attached to the outer robot arm 14. The bracket 107 is normally used in a circular array. The bracket 107 is normally utilized in a pair in which only one is shown in the figure. Four brackets 107 would be roughly comparable in use to the single bracket 102 with four struts 118 shown in FIG. 10, but would be less expensive to fabricate. Such bracketry is specific to each robot model.

Whereas it has been previously presented that robot 10 picks up the rotatable pallet 20 to begin its work cycle on work-pieces contained thereon, it is also within the scope of the present invention that while retaining the same pallet 20, the robot 10 could continue to utilize the same pallet 20 while it loaded a set of work-pieces, completed its operations, and then unloaded those work-pieces to begin working on the next set of work-pieces. Robot 10 would then change to a different pallet 20 only when another type of work-piece assembly is to be processed.

Figure 12:
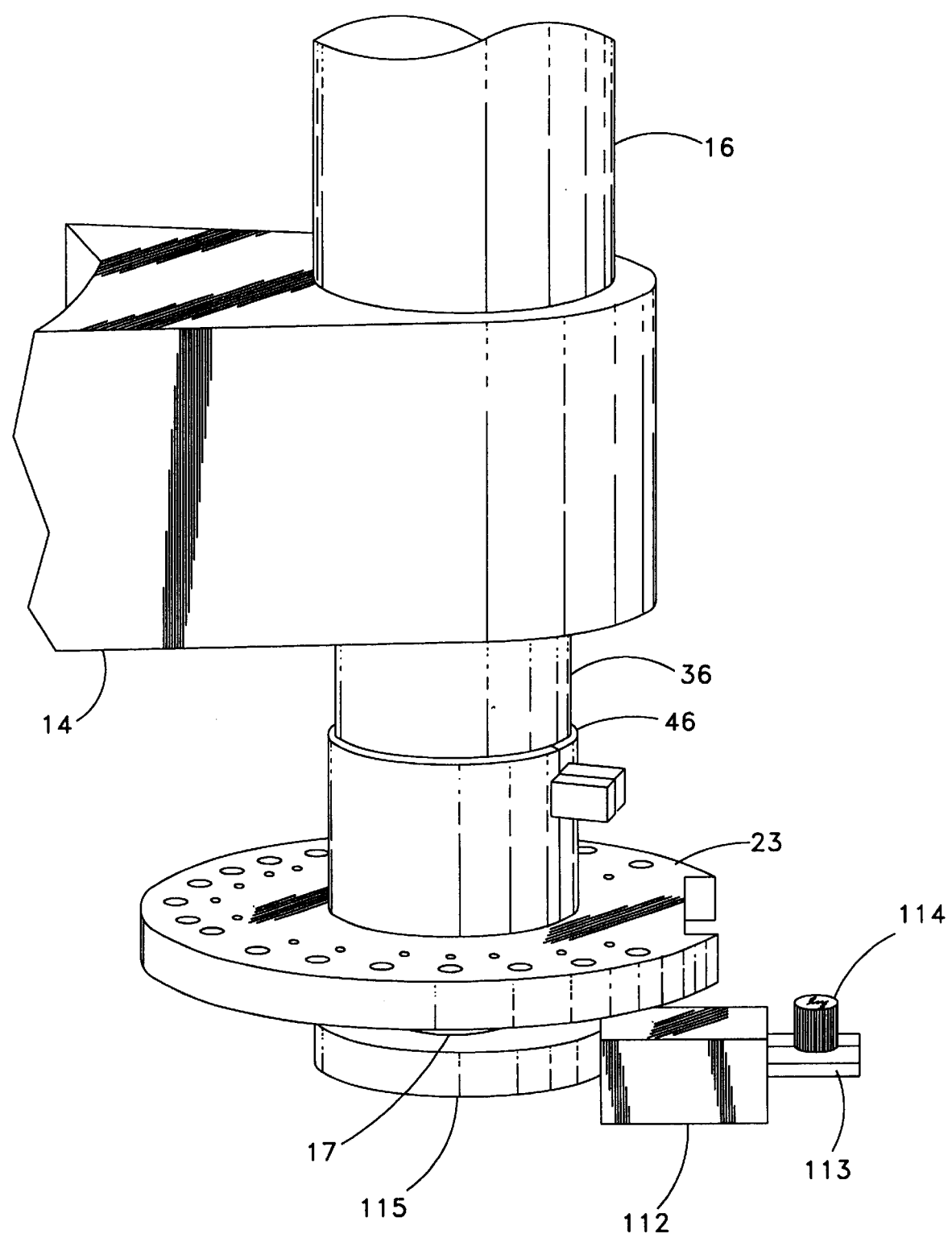
FIG. 12 is a perspective view of the tooling plate attached to the arm of the robot. A gripper is mounted to a user flange for rotating a single work-piece under the tooling plate. For clarity in the figure, the processing tools on the tooling plate have been omitted.

Referring to FIG. 12, there is illustrated the outer link arm 14, the quill cover 16, quill guide 36, user flange 17, tooling plate 23, and clamping tube 46. For clarity, the tools are not shown mounted to the tooling plate 23. It is within the intended scope of the present invention that the robot end effector could have a horizontal gripper that holds a single work-piece off the central axis of rotation so that it was rotated under the tooling plate 23, as shown in this figure. The pallet gripper and rotatable pallet have been replaced by a gripper holder 115 which is fixed to the user flange 17. The gripper holder 115 is carrying a gripper 112 with gripper jaws 113 carrying a work-piece 114. In addition to working with work-stations positioned at the periphery of the robot work envelope, the robot 10 can rotate the gripper 112 to present the work-piece 114 to tools mounted on the tooling plate 23. The work-piece 114 can be a small pallet carrying a work-piece on it when it is gripped by gripper 112.

Having a general apparatus and method for easily mounting and using such tools will suggest additional tooling capabilities for specific needs. Other tools will be of a less general nature, specific to a particular processing need. Mounting of such tooling on a tooling plate under the robot head is within the intended scope of the present invention.

Figure 13:
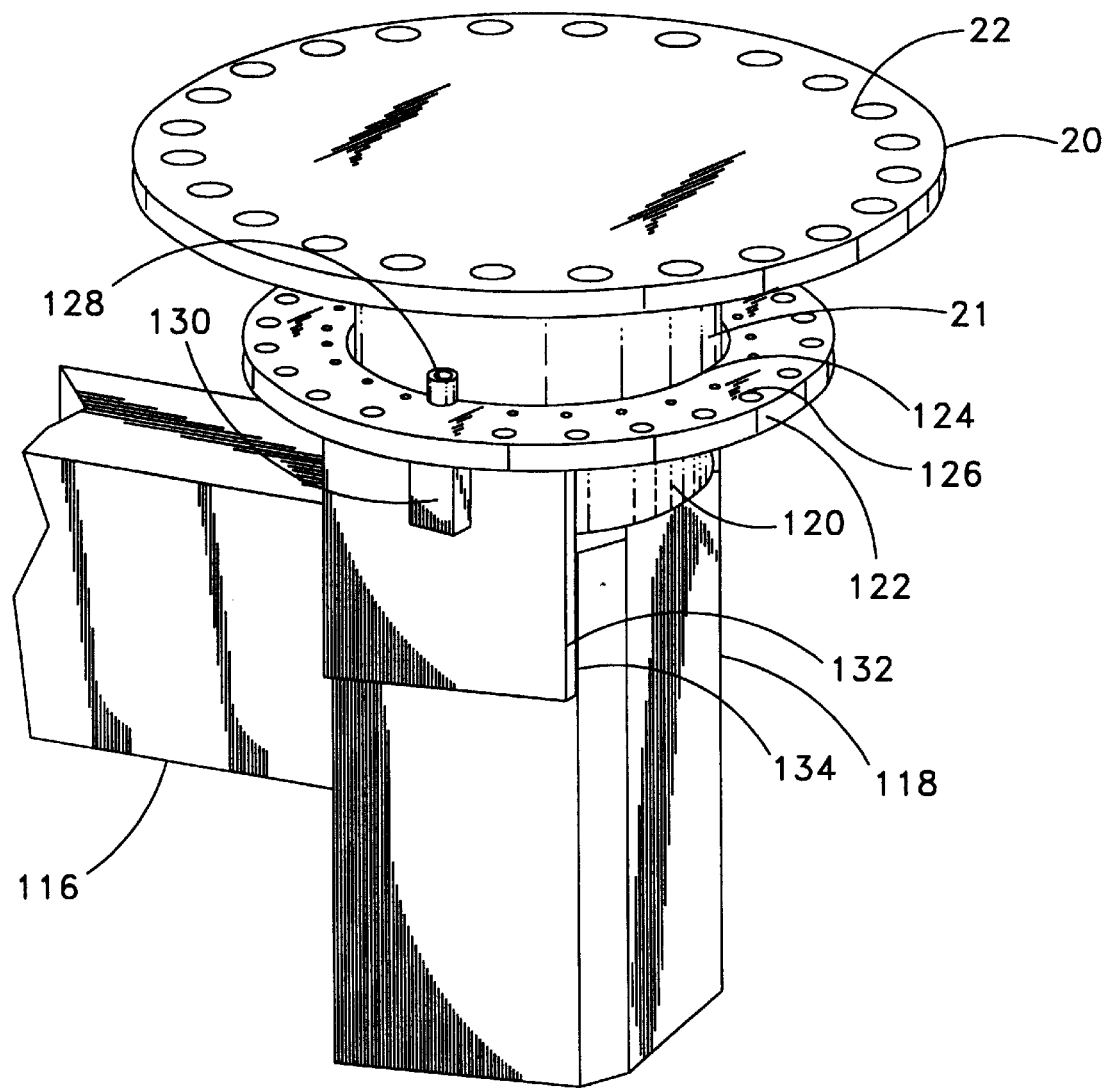
FIG. 13 is a perspective view of a rotatable pallet which is mounted above the head of the robot and with the tooling plate mounted below the rotatable pallet. For clarity in the figure, the processing tools on the tooling plate have been omitted.

FIG. 13 illustrates an alternative method of mounting the tooling plate 122 to a different robot. This figure illustrates a case where the rotatable pallet 20 would be held above the robot head and the tooling plate 122 would be below the rotatable pallet 20. The apparatus in FIG. 13 is used for processing small work-pieces in ultra clean environments where mechanisms should not be positioned above the work-pieces. For clarity in the illustration, no tools are shown mounted on the tooling plate 122, however, any of those previously illustrated tools could be inverted and fixed to the tooling plate 122 from the lower surface. By way of example, the end of the outer arm 116 is a Seiko TT4000SC robot. The end effector wrist 118 is mounted in the inverted position with the end effector mounting flange 120 positioned upwardly. Pallet vacuum gripper 21 is mounted on flange 120 and grips rotatable pallet 20 with nests 22. The tooling plate 122 has a central cylindrical clearance hole 124 which is affixed to the robot wrist 118 on two sides by support bolts 128 through the tooling plate 122 into bolting bosses 130 on the side of plates 132 (only one is shown) which are bonded by adhesive means 134 to the sides of wrist 118.

In the robot of FIG. 13, and in many others, movement in the vertical (Z) axis of the end effector is accomplished by the support column raising and lowering the upper and outer arm assembly so that the end effector can rotate but not elevate with respect to the tooling plate of the present invention.

With rotatable pallets with many nests, it is usually impractical to make connections to individual nests through pallet gripper 21 as commonly done with robot end effector change tooling.

Figure 14:
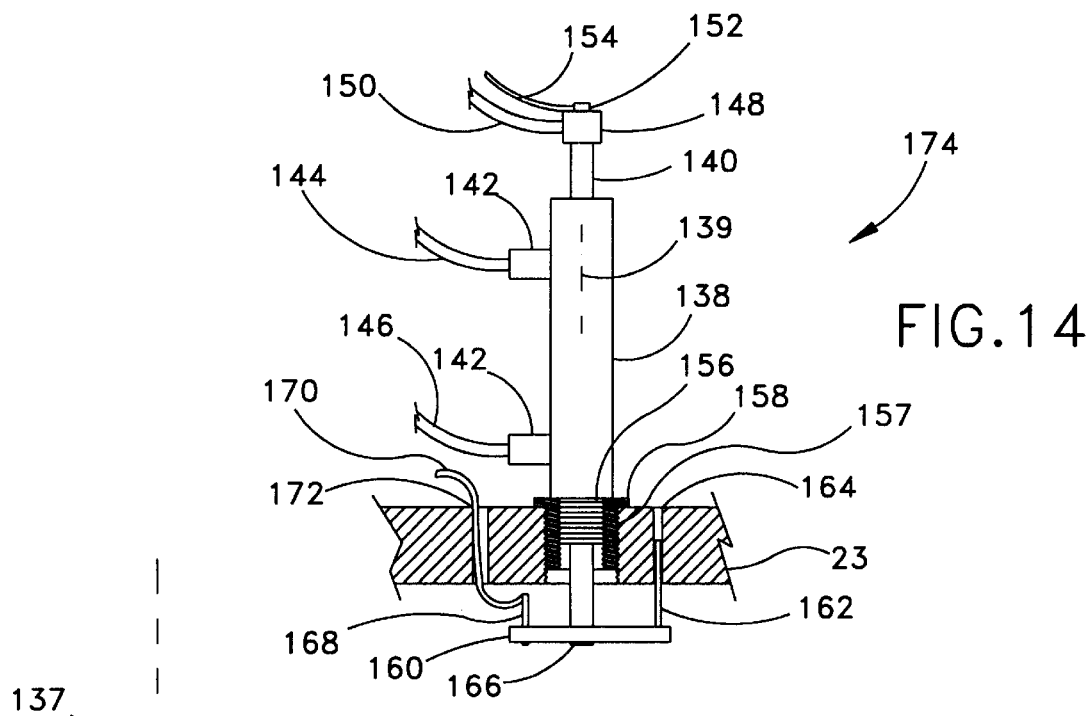
FIG. 14 is a partial cross-sectional view of the nest actuator assembly mechanism which is mounted to the tooling plate.
Figure 15:
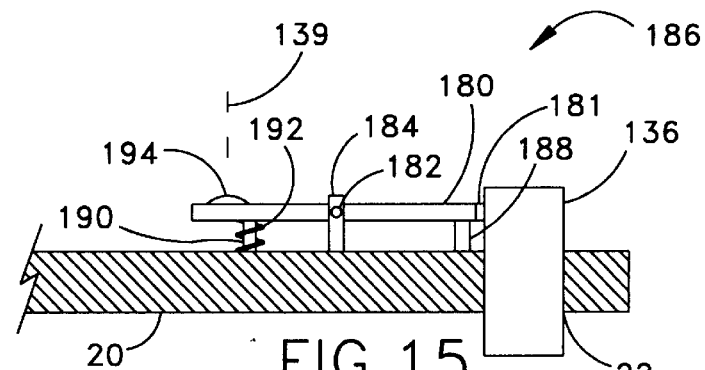
FIG. 15 is a partial cross-sectional view of a mechanism associated with a nest which is aligned with the actuator in FIG. 14 and operated by motion of the actuator above it.
Figure 16:
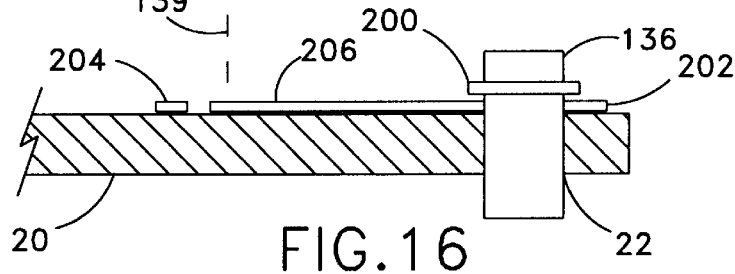
FIG. 16 is a partial cross-sectional view of an electrical contact associated with a nest which is aligned with the actuator in FIG. 14 and operated by electrical contact of the actuator above it.
Figure 17:
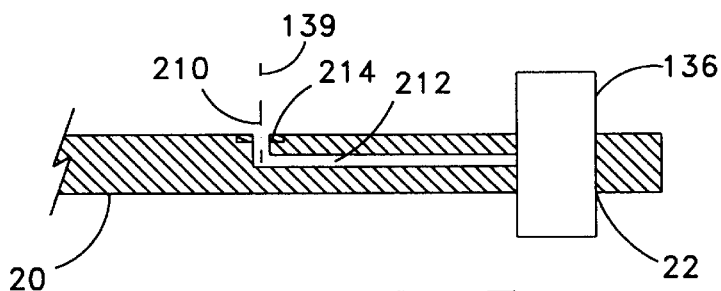
FIG. 17 is a cross-sectional view of a pneumatic connection associated with a nest which is aligned with the actuator in FIG. 14 and operated by contact and action of the actuator above it.

Referring to FIGS. 14, 15, 16, and 17, there are illustrated a tool for mounting on the tooling plate 23 that when pressed down against the rotatable pallet 20 provides mechanical, electrical, and pneumatic connections to successive selected individual nests 22. It is normally used to process a series of nests 22, one at a time. FIG. 14 is a nest actuator tool 174 which may be used for all such connections. FIG. 15 shows mechanical connections to nests at the periphery of rotatable pallet 20. FIG. 16 shows electrical connections. FIG. 17 shows pneumatic connections. Only one pallet 20 would be used at a time under the tooling plate 23 and each nest 22 in pallet 20 could have one, some, or all of the mechanisms illustrated. All mechanisms in the figures are aligned to cylinder centerline 139.

Referring now to FIG. 14, there is illustrated a pneumatic cylinder 138 with a shaft 140 on centerline 139 mounted on tooling plate 23 radially between the quill centerline 137 on the left side of the figure and rotatable pallet nests 22 on the right. Cylinder 138 is mounted by its nose 156 into an electrical isolation bushing 158 which is mounted on the tooling plate 23. Cylinder shaft 140 is normally retracted by air from air line 146 through fitting 142, and extended by air from air line 144 through another fitting 142. Shaft 140 is hollow and opens at the bottom 166. At the top, shaft 140 has a metal (electrically conducting) fitting 148, terminating hollow shaft 140 and connecting through air line 150 to the pneumatic control system of robot. Screw 152 terminates a wire 154 into the metal fitting 148 providing a continuous electrical circuit down to hollow shaft tip 166. Additional connections are mounted to plate 160 attached to the lower end of shaft 140 which is kept rotationally aligned by a pin 162 moving vertically in hole 164 in tooling plate 23. An example of an additional connection is electrical spring pin 168 which is mounted on plate 160 connected by wire 170 to the robot electrical controls and passing through tooling plate 23 via hole 172, which can be one of the unused dowel pin holes 56, as shown in FIG. 2. Electrically isolated pins 168 would be used or plate 160 would be made of a non-conducting material such as plastic or have insulator bushings (not illustrated) for the pins 168. While any of the following actuation actions would justify use of a pneumatic actuator 174 to contact the rotatable pallet 20, the preferred embodiment provides all three capabilities in a simple mechanism as will now be discussed.

FIG. 15 is located directly below FIG. 14 to show how movement of cylinder shaft 140 can cause one of several desirable mechanical actions on a selected nest 22 in rotatable pallet 20. The mechanisms are shown vertically separated for illustration clarity, whereas there would normally be only a small vertical clearance between shaft end 166 and contact button 194. A simple cylindrical work-piece 136 is resting in selected nest 22 in rotatable pallet 20. The work-piece 136 is free to fall through nest 22 except that it is horizontally jammed by arm 180 pushing elastomer bumper 181 against it. Arm 180 is rotated clockwise about pivot 182 and supported by a bracket 184 by the action of compression spring 192 held in alignment by pin 190 and stopped in the horizontal plane by pin 188 under the outboard end of arm 180. Therefore, the normal position of arm 180 is to retain the work-piece 136 in nest 22 for most processing on the rotatable pallet 20. However, during loading of pallet 20, and for unloading work-pieces 136, arm 180 must be released by rotating it counterclockwise about pivot 182 in direction 180. This is accomplished by pallet actuator 174 pushing shaft tip 166 down against mechanical contact 194 which is aligned with centerline 139 of actuator assembly 174. Depressing button 194 releases arm 180, and permitting work-piece 136 to be inserted into, or to be dropped out of the rotatable pallet 20. This is but one of several possible useful mechanism that could be placed on pallet 20 for which a vertical mechanical actuator assembly 174 could be useful.

Referring to FIG. 16, there is shown a partial cross-sectional view through pallet 20 that has electrical conductor 206 affixed to it onto which ring contact 200 on work-piece 136 rests on one side, and contacts conductor 206 on the other side which is connected behind the plane of conductor 206 to conductor 204, establishing a complete electrical circuit through the work-piece. The more general case for this type of need is for pallet 20 to be constructed of printed circuit board type laminated fiberglass with the conductors being traces on surfaces or through the fiberglass and with button or spring contacts where those traces were touched. Actuator assembly 174 in FIG. 14 is aligned on centerline 139. When shaft 140 is extended by incoming air in line 144, shaft tip 166 travels down and contacts conductor 206 and electrical spring pin 168 on plate 160 contacts conductor 204, completing an electrical circuit through work-piece 136. As soon as processing operations on work-piece 136 are completed, shaft 140 would be raised by air pressure in line 146 and the robot would rotate pallet 20 to the next selected work-piece 136. Electrical contact 168 is of the type used in high density printed circuit board testers known to the art as "bed of nails" testers and are readily available in center-to-center spacings as small as 0.050"; therefore, it will be seen that rather than only a single electrical contact, wire 170 could be a flat ribbon cable with perhaps twenty-four (24) individual conductors terminating in a similar number of spring-loaded contacts 168 and routed around the outboard edge of tooling plate 23. Such contacts are needed for tasks such as testing and laser trimming of six-lead pressure sensors for temperature compensation. By using actuator assembly 174, only six connections are necessary rather than six for each work-piece carried on rotatable pallet 20.

Referring now to FIG. 17, there is depicted a means for actuator assembly 174 to provide a pneumatic connection to a work-piece 136 resting in nest 22 of rotatable pallet 20. Aligned on centerline 139 is a vertical passage 210 through elastomer pneumatic seal 214 to horizontal passage 212 connecting to work-piece 136. When hollow shaft 140 is moved down by the action of air pressure in line 144, hollow shaft tip 166 moves down to rest firmly on seal 214. When positive or negative air pressure is introduced through line 150 and fitting 148, it is then connected to nest 22 holding work-piece 136. One application not illustrated would be for air passage 212 to provide air for an air bearing established between nests 22 and the vertical surfaces of work-piece 136 such as when making extremely precise fills by weight of costly pharmaceutical products in small containers in which a highly accurate empty weight of the container must be determined so that the net weight of the contents is determined to a higher accuracy than available under current production automation art.

While specific utility examples for mechanical, electrical, and pneumatic connections from tooling plate 23 through pallet 20 to individual nests 22 have been disclosed, the present invention is the apparatus and method of making such connections rather than the actions that are then enabled. Clearly a single, simple device primarily utilizing only an air cylinder provides connections useful in some applications. Connections for other gases and liquids such as oil, air, solvents, cooling or heating air, are accomplished in a similar manner. Connection of other mechanical devices such as fiber optic strands is discussed later in FIGS. 18 and 19. The same mechanisms would be utilized whether the pallet was below the tooling plate as depicted in FIG. 1, or above the tooling plate as depicted in FIG. 13.

With some connections, such as electrical connections, a single actuation of actuator 174 will establish connections to multiple nests by conductor arrays leading from the contact point to a plurality of nests 22. Tooling plate 23 permits mounting of a plurality of such actuators 174 for making a plurality of sets of connections simultaneously.

When the robot can move pallet 20 vertically relative to tooling plate 23 as well as to rotate it, a faster processing method is possible. The robot then normally carries rotatable pallet 20 some operating distance below tool plate 23. When connections to selected individual nests 22 are desired, shaft 140 with the mechanical, electrical, and pneumatic devices is lowered. The robot then raises rotatable pallet 20 to contact the extended head of actuator assembly 174. Then air pressure in line 150 is maintained to act as a pneumatic spring on shaft 140 while the robot moves rotatable pallet 20 down only about 0.050" inches to clear the connections, rotates rotatable pallet 20 to the next selected nest 22 and then raises rotatable pallet 20 to 0.050" to make the connections. The robot is then able to process work-pieces much faster than the much longer cycle time required to move the pneumatic cylinder shaft 140 up and down and produces a much softer impact on making the connections. The connections are then accomplished without the violent end-of-stroke decelerations characteristic of high speed pneumatic cylinder movements.

Referring to FIGS. 18 and 19, there is shown an apparatus for making connections for higher pressure fluids and gasses or for fiber optics where the connections must be closely aligned. FIG. 18 shows a connector 220 with a female connection supported in a plate 224 which may be either a tooling plate 23 or moving actuation plate 160, as shown in FIG. 14. FIG. 19 shows a connector 222 with a male connection and is mounted on rotatable pallet 20.

Referring to FIG. 18, there is illustrated a supply connection 226 for either a gas, liquid, fiber optic strand, or fiberoptic bundle. Connection 226 is one end of body 228 which is inserted through cavity 225 in plate 224 and supported by snap rings 230 in retaining grooves 232. Clearance gap 234 is between body 228 and plate 224 and permits lateral alignment of connector 220 with connector 222. A cutaway section view 254 shows the female cone surface 238. A cutaway section view 256 shows the ring retaining groove 232.

Referring now to FIG. 19, there is illustrated the male connector 222. The receiving gas or liquid port or fiber optic strand 242 is shown in a cutaway section view 258. Body 246 has outer threads 244 which mates with the rotatable pallet 20. Body 246 has a preferably horizontal tube or strand 248 leading to work-piece nests 22. Tube or strand 250 exits in line with the connector centerline 260 when a horizontal orientation is not possible.

Referring to FIGS. 18 and 19, connectors 220 and 222 are separated by a vertical distance 252 which is approximately as little as 0.050" before the connection is made. When the connectors 220 and 222 are small, connector 220 may be on plate 160 of actuator assembly 174 in FIG. 14. Assembly 174 would not then need a hollow shaft, electrical isolation, or electrical contactor 168. When connectors 220 and 222 are larger, connector 220 would be in tooling plate 23 and body 228 would extend further below tooling plate 23. Alternatively, connector 220 can be a male connection and connector 222 can be a female connection.

The method of operation of connectors 220 and 222 is the same in making the connections as previously explained for actuator assembly 174 acting on pallet 20. When connector 220 is in tooling plate 23, the robot rotates pallet 20 to the selected nest 22 and then raises pallet 20 until connector 222 mates to connector 220.

Figure 20:
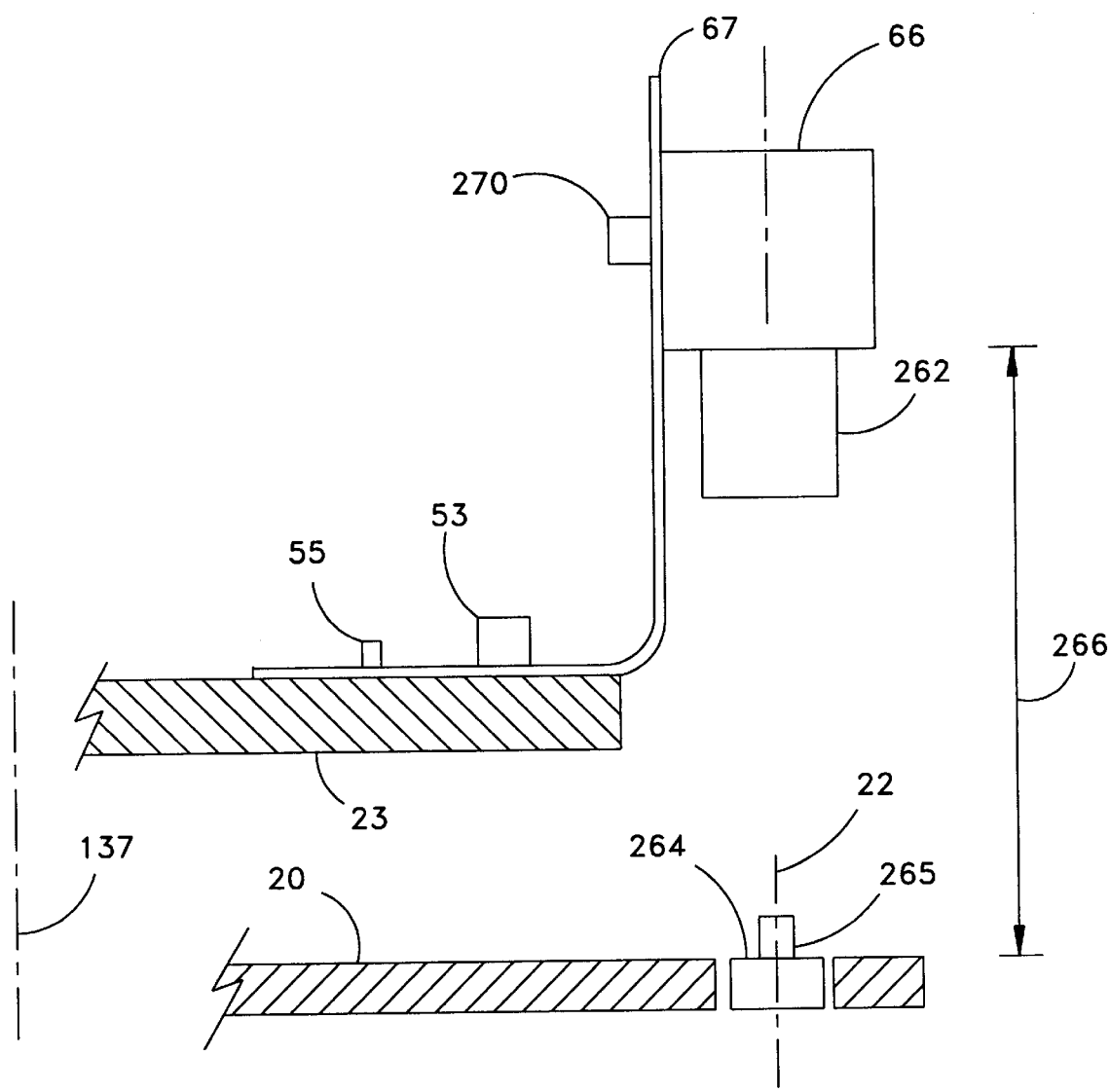
FIG. 20 is a partial cross-sectional view of a video camera which is mounted to the tooling plate and vertically viewing a nest on the rotatable pallet.

Referring to FIG. 20, there is illustrated a partial closeup cross-sectional view of a video camera 66 with lens 262 mounted on a bracket 67 to tooling plate 23 using bolt 53 and dowel pin 55 relative to quill centerline 137. Camera 66 is vertically adjustable on bracket 67 by moving a bolt 270 in a vertical slot (not shown) in bracket 67. Below camera 66 is the rotatable pallet 20 with nest 22 holding work-piece 264 which has a feature 265 at a different height. Video camera 66 has an internal focusing plane on the (CCD sensor. The focal distance 266 from camera 66 to work-piece 264 is normally fixed. The robot presents features of work-piece 264 such as feature 265, by vertically moving and rotatable pallet 20 to present the desired field of view and focal distance to the camera 66 for the inspection. Where lens 262 is a high magnification lens with a short depth of field, a machine vision computer under prior art can accurately determine the height of a feature 265 on work-piece 264 by measuring when an edge is in sharpest focus.

An important use of vertical close up camera 66 is for highly accurate registration of work-pieces 264 in nests 22. Automatic assembly machines must have highly accurate registrations of components to which other components are to be added. In dedicated automatic assembly equipment, such accuracies are obtained by tightly tolerancing the work-pieces and all tools and tooling mounts that affect the registration of the assembly tools to the work-piece. Close tolerancing is costly and may prevent some operations from being automated. Important applications of the rotatable pallet and tooling plate inventions will be in automating operations currently performed by humans under microscopes in clean rooms for products such as semiconductor devices. For some products, such as surgically implanted intraocular lenses supported in nests 22 by tiny, flimsy haptics, it is mandatory that the center of the optic be found by camera 66 when measuring optical properties of the lenses.

Camera 66 on the tooling plate 23 of the robot is used to locate features on the work-piece itself as it rests in nest 22 of pallet 20 and to record the X, Y, and Z offsets from a nominal position for each nest 22 on pallet 20. When the robot presents a work-piece to an operating station not on the tooling plate, for each work-piece it is then able to offset the location of the nest 22 to compensate for most tooling inaccuracies. Mounting the camera 66 on the head of the robot enables making highly accurate and repeatable location measurements of work-pieces as they rotate about the quill.

Figure 21:
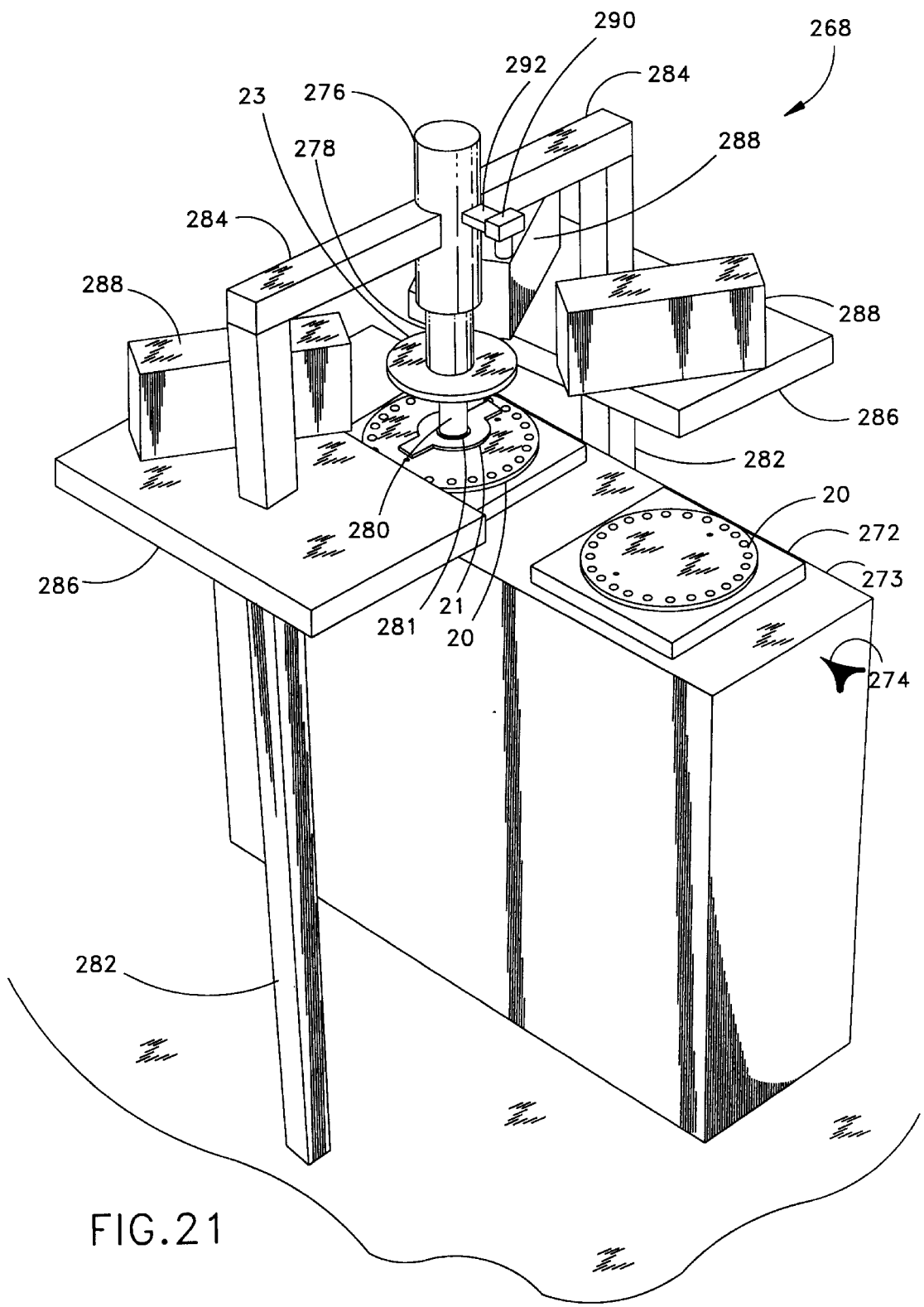
FIG. 21 is a perspective view of a work-station and a pallet conveyor positioned above an indexing head, the pallet conveyor conveying the rotatable pallets under the indexing head.

Referring to FIG. 21, it is the relative motion of the rotatable pallet 20 to the tooling plate 23 which is useful for processing work by enabling presentation of part nests 22 to various tools mounted to tooling plate 23. The robot may therefore perform useful work before it arrives at a work station in its operating envelope. FIG. 21 shows a pallet conveyor 273 of the prior art moving rotatable pallets 20 on prior art rectangular pallets 272 in direction 274. On conveyor 273, rotatable pallet 20 on prior art rectangular pallet 272 is caused to stop under a station 268 which includes an indexing head 276 capable of moving a quill 280 with a pallet gripper end effector 281 vertically and rotationally about its centerline. Below head 276 is a lower bearing support 278 which is mounted to tooling plate 23 with a plurality of tools (not shown) as earlier described. Head 276 performs the functions, of the robot in vertically moving and rotating rotatable pallet 20, but is not free to move horizontally in the X and Y directions. Head 276 is supported by vertical struts 282 and horizontal struts 284 on both sides of the conveyor 273. Work tables 286 are supported from vertical struts 282 and can also be attached to the sides of pallet conveyor 273. On work tables 286, a plurality of work stations 288 are arrayed according to the prior art of dedicated automation horizontal indexing dials, such as part feeders with pick and placement from the feed track to an advantageous position on a work-piece being worked on. Work-stations 288 are primarily those which feed and place components to work-pieces on rotatable pallet 20. Video camera 290 is supported from head 276 by a bracket 292 and views work-pieces in nests 22 of the rotatable pallet 20. When a rotatable pallet 20 is stopped under head 276, vacuum pallet gripper 21 is moved down to grip the rotatable pallet 20 and then raise it to the operating position under the tooling plate 23 which is also the operating height for work-stations 288. The vertical distance that the rotatable pallet 20 is raised will typically be less than two (2) inches, but can be as much as six (6) inches. The rotatable pallet 20 is then rotated and elevated as tools on tooling plate 23 and work-stations 288 perform useful processing on work-pieces then carried on rotatable pallet 20 in the same manner as if the parts were carried on the head of a robot, but at a reduced cost for the station mechanisms. Upon completion of the selected tasks, head 276 moves pallet gripper 21 down and releases the rotatable pallet 20 back onto the rectangular pallet 272 and then moves upward to clear the rotatable pallet 20 during indexing of pallet conveyor 273.

Work-station 268 is a hybrid of important automation technologies. It uses the flexibility of pallet conveying systems to move work along a processing line while for small parts overcoming their inherent speed limitation in taking two to four seconds to move a pallet into an operating station by carrying a plurality of work-pieces. After the rotatable pallet is picked up and vertically moved up into the operating position it uses the very common methods and tools of rotary indexing dial machines in performing a plurality of operations on work-pieces each time the dial (rotatable pallet) is indexed. The head 276 has the capability to rapidly move quill 280 to intermediate vertical positions, and the rotatable pallet 20 can be moved vertically to simplify the operations of tools on tooling plate 23 and work-stations 288 in performing processing.

As presented in this application, simple tools mounted on a central tooling plate around a head capable of lifting and rotating a rotatable pallet can simplify small part assembly and processing equipment. Rotatable pallet 20 can include linear arrays of work-pieces of two or more work-pieces carried on rotatable pallets 20 with more than three straight sides. With the rigid mounting of head 276, weight of the tooling plate 23 and tool array may be much larger than when a robot would have to move them.

In low volume, highly variable production cells, a robot is used with a very large number of work-stations arrayed around the work envelope. For medium volume production cells, a robot operates on the side of a conveyor line with a more limited scope of tasks. FIG. 21 discloses that for higher volume production cells using a rotatable pallet moving along a conveyor line, the robot may be replaced by more dedicated, less flexible equipment. Therefore, rotatable pallets are useful and cost effective at all levels of production. The tooling plate 23 is useful in reducing cost and size of the equipment and in increasing production speed in all forms of equipment utilizing rotatable pallets.

An embodiment of the present invention is defined as an apparatus, for assembly and processing work-pieces retained on a rotatable pallet having a plurality of work-piece nests for retaining the work-pieces, the apparatus comprising: (a) a robot having a head and capable of controlled X, Y, and Z movements, the robot further having a wrist joint capable of rotation in a horizontal plane; (b) a tooling plate for retaining a plurality of processing tools to perform a plurality of different operations on said work-pieces which are positioned by said robot relative to the plurality of processing tools; (c) means for mounting said tooling plate to said head of said robot such that said tooling plate is fixed; (d) means for mounting said plurality of processing tools to said tooling plate; and (e) an end effector attached to said wrist joint of said robot for temporarily gripping said rotatable pallet such that said rotatable pallet can rotate so that said work-pieces on said rotatable pallet are moved relative to said plurality of processing tools on said tooling plate.

Another embodiment of the present invention is defined as an apparatus for assembly and processing at least one work-piece, comprising: (a) a robot having a head and capable of controlled X, Y, and Z movements, the robot further having a wrist joint attached to an end effector capable of rotation in a horizontal plane; (b) a tooling plate for retaining at least one, processing tool to perform an operation on said at least one work-piece which is positioned by said robot relative to the at least one processing tool; (c) means for mounting said tooling plate to said head of said robot such that said tooling plate is fixed; (d) means for mounting said at least one processing tool to said tooling plate; and (e) a gripper holder attached to said end effector of said wrist joint of said robot for temporarily gripping said at least one work-piece such that the gripper holder can rotate and move vertically so that said at least one work-piece is moved relative to said at least one processing tool on said tooling plate.

Defined broadly, the present invention is an apparatus for assembly and processing work-pieces retained on a rotatable pallet for retaining the work-pieces and to be used in conjunction with a robot having a head capable of controlled X, Y, and Z movements, the robot further having a wrist joint attached to an end effector capable of rotation in a horizontal plane, the apparatus comprising: (a) a tooling plate for retaining a plurality of processing tools to perform a plurality of different operations on said work-pieces which are positioned by said robot relative to the plurality of processing tools; (b) means for mounting said tooling plate to said head of said robot such that said tooling plate is fixed; and (c) means for mounting said plurality of processing tools to said tooling plate.

Defined most broadly, the present invention is an apparatus for assembly and processing at least one work-piece retained on a gripper holder and to be used in conjunction with a robot having a head capable of controlled X, Y, and Z movements, the head attached to the gripper holder, the apparatus comprising: (a) a tooling plate mounted to said head of said robot for retaining at least one processing tool to perform an operation on said at least work-piece which is positioned by said head of said robot relative to the at least one processing tool; and (b) means for mounting said at least one processing tool to said tooling plate.

The present invention is also broadly defined as an apparatus for assembly and processing at least one work-piece retained on a rotatable pallet, comprising: (a) a head having a wrist joint attached to an end effector, the head being capable of moving the end effector vertically and rotating the end effector in a horizontal plane; (b) a tooling plate removably mounted to said head; (c) at least one processing tool removably mounted to said tooling plate for performing an operation on said at least one work-piece which is positioned by said head relative to the at least one processing tool; and (d) a gripper holder attached to said end effector of said wrist joint of said head for temporarily gripping said rotatable pallet containing said at least one work-piece such that said at least one work-piece is positioned relative to said at least one processing tool on said tooling plate.

The present invention is also broadly defined as an apparatus for assembly and processing at least one work-piece, comprising: (a) a head having a wrist joint attached to an end effector, the head being capable of moving the end effector vertically and rotating the end effector a horizontal plane; (b) a tooling plate mounted to said head; (c) at least one processing tool mounted on said tooling plate for performing an operation on said at least one work-piece which is positioned by said head relative to the at least one processing tool; and (d) a gripper holder attached to said end effector of said wrist joint of said head for temporarily gripping said at least one work-piece such that the gripper holder can rotate and move vertically so that said at least one work-piece is relative to said at least one processing tool on said tooling plate.

The present invention can also be defined as a method for processing work-pieces utilizing a robot capable of moving its head in the X, Y and Z directions with a wrist joint rotatable in a horizontal plane, the method comprising the steps of: (a) utilizing a rotatable pallet which has a plurality of nests for retaining a plurality of work-pieces; (b) mounting a pallet-gripping end effector on said head of said robot; (c) grasping said rotatable pallet with said end effector on said head of said robot; (d) utilizing a tooling plate which has a plurality of processing tools and located adjacent to said rotatable pallet; (e) presenting a work-piece on said rotatable pallet to said plurality of processing tools; (f) performing a task on said work-piece; (g) indexing said rotatable pallet to present another work-piece to said plurality of processing tools by rotating said wrist joint of said robot; and (h) repeating steps (e) through (g) sequentially for all said plurality of work-pieces.

An additional limitation to the present invention includes the above method comprising the steps of: (a) utilizing a vertical part gripper on said tooling plate not moving with said end effector of said robot; (b) moving said rotatable pallet by said robot by positioning an enlarged opening on said rotatable pallet underneath said vertical part gripper; (c) actuating said vertical part gripper to extend downwardly through said enlarged opening on said rotatable pallet; (d) gripping a selected work-piece beneath said rotatable pallet from a supply point; (e) retracting said vertical part gripper by drawing said selected work-piece up through said enlarged opening; (f) rotating said rotatable pallet until a selected nest is underneath said vertical part gripper; (g) moving said rotatable pallet upwardly and adjacent to said selected work-piece; (h) releasing said gripping of said selected work-piece on said selected nest of said rotatable pallet; (i) moving said rotatable pallet by said robot relative to said work-piece to a downwardly position away from said work-piece; and (j) repeating steps (a) through (i) sequentially until all of said plurality of nests have been filled with said work-pieces.

Another limitation to the present invention includes the above method further comprising the steps of: (a) utilizing a vertical part gripper on said tooling plate not moving with said end effector of said robot; (b) rotating said rotatable pallet until a selected nest is underneath said vertical part gripper; (c) actuating said vertical part gripper causing it to extend downwardly on said rotatable pallet; (d) gripping a selected work-piece on said selected nest on said rotatable pallet; (e) retracting said vertical part gripper; (f) moving said rotatable pallet by said robot by positioning an enlarged opening on said rotatable pallet underneath said vertical part gripper; (g) actuating said vertical part gripper causing it to extend downwardly through said enlarged opening; (h) releasing said gripping of said selected work-piece to a work envelope of said robot; (i) repeating step (e); and (j) repeating steps (b) through (i) sequentially until all of said work-pieces have been removed from said plurality of nests of said rotatable pallet.

Another limitation to the present invention includes the above method in accordance with claim 59 further comprising the steps of: (a) utilizing first and second cylinders acting through gimbals to cause the first cylinder to force the second cylinder to move through an arc; (b) moving said head of said robot so that a gripper on said second cylinder contacts a work-piece resting within a work envelope of said robot; (c) gripping said work-piece with said gripper of said second cylinder; (d) retracting said second cylinder; (e) retracting said first cylinder which causes said second cylinder to return in its arc to be vertically aligned with a selected nest on said rotatable pallet; (f) actuating said second cylinder to extend downwardly to position said work-piece to said selected nest; (g) releasing said gripping of said work-piece onto said selected nest; (h) moving said rotatable pallet downwardly away from said gripper while said second cylinder retracts; and (i) repeating steps (b) through (h) sequentially until all of said plurality of nests have been filled with a plurality of work-pieces.

Another limitation to the present invention includes the above method further comprising the steps of: (a) utilizing first and second cylinders acting through gimbals to cause the first cylinder to force the second cylinder to move through an arc; (b) moving said head of said robot so that said gripper on said second cylinder contacts a work-piece resting within a selected nest of said rotatable pallet; (c) gripping said work-piece with said gripper of said second cylinder; (d) retracting said second cylinder; (e) retracting said first cylinder which causes said second cylinder to return in its arc to be vertically aligned with said selected nest on said rotatable pallet; (f) actuating said second cylinder to extend downwardly to position said work-piece to a work envelope of said robot; (g) releasing said gripping of said work-piece; (h) retracting said second cylinder; (i) rotating said rotatable pallet to another selected nest; and (j) repeating steps (a) through (h) sequentially until all of said plurality of work-pieces have been removed from said rotatable pallet.

The present invention can also be defined as a method for processing work-pieces utilizing a robot capable of moving its head in the X, Y and Z directions with a wrist joint rotatable in a horizontal plane, the method comprising the steps of: (a) mounting an end effector on said wrist joint of said head of said robot for holding a selected work-piece; (b) gripping said selected work-piece from a supply point with said end effector of said robot; (c) utilizing a tooling plate which has a plurality of processing tools on said head of said robot; (d) presenting said selected work-piece to said plurality of processing tools; (e) performing a task on said selected work-piece; (f) releasing said gripping of said selected work-piece to a desired position within a work envelop of said robot; and (g) repeating steps (b) through (f) sequentially for all work-pieces at said supply point.

The present invention can further be defined as a work-station for assembly and processing work-pieces retained on a plurality of rotatable pallets each having a plurality of work-piece nests for retaining the work-pieces, the work station having a pallet conveyor with a plurality of rectangular pallets, where the plurality of rotatable pallets are respectively placed on the plurality of rectangular pallets and the pallet conveyor respectively moves the plurality of rotatable pallets on the plurality of rectangular pallets in a horizontal direction to a gripping position, the work-station comprising:

(a) an indexing head mounted above said gripping position and having a shaft with a wrist joint attached to a pallet gripper, the shaft being capable of vertically moving the pallet gripper downwardly to said gripping position for temporarily gripping said plurality of rotatable pallets respectively, and the shaft being further capable of rotating the pallet gripper in a horizontal plane;

(b) a tooling plate mounted to said head of said work-station and located adjacent to and above said pallet gripper; and (c) a plurality of processing tools mounted on said tooling plate for performing a plurality of different operations on said work-pieces contained on said plurality of rotatable pallets;

(d) whereby said conveyor pallet respectively moves said plurality of rotatable pallets to said gripping position, and said shaft of said head moves said pallet gripper downwardly to said gripping position for temporarily gripping said plurality of rotatable pallets from said plurality of rectangular pallets respectively such that said plurality of rotatable pallets can be elevated and rotated so that said work-pieces contained on said plurality of rotatable pallets are worked on by said plurality of processing tools on said tooling plate.

Another definition of the present invention is a work-station for assembly and processing work-pieces retained on a plurality of rotatable pallets each having a plurality of work-piece nests for retaining the work-pieces, the work station having a pallet conveyor with a plurality of rectangular pallets, where the plurality of rotatable pallets are respectively placed on the plurality of rectangular pallets and the pallet conveyor respectively moves the plurality of rotatable pallets on the plurality of rectangular pallets in a horizontal direction to a gripper position, the work-station comprising:

(a) a head mounted above said gripping position and having a wrist joint attached to a pallet gripper, the head being capable of vertically moving the pallet gripper downwardly to said gripping position for temporarily gripping said plurality of rotatable pallets respectively, and the head being further capable of rotating the pallet gripper in a horizontal plane; (b) a tooling plate mounted to said head of said work-station and located adjacent to and above said pallet gripper; and (c) at least one processing tool mounted on said tooling plate for performing an operation on said work-pieces contained on said plurality of rotatable pallets; (d) whereby said conveyor pallet respectively moves said plurality of rotatable pallets to said gripping position, and said head moves said pallet gripper downwardly to said gripping position for temporarily gripping said plurality of rotatable pallets from said plurality of rectangular pallets respectively such that said plurality of rotatable pallets can be elevated and rotated so that said work-pieces contained on said plurality of rotatable pallets are worked on by said plurality of processing tools on said tooling plate.

A further definition of the present invention is a work-station for assembly and processing work-pieces, the work-station having a pallet conveyor with a plurality of rectangular pallets and a plurality of rotatable pallets each retaining at least one work-piece, where the plurality of rotatable pallets are respectively placed on the plurality of rectangular pallets and the pallet conveyor respectively moves the plurality of rotatable pallets to a gripping position, the work-station comprising: (a) a head being capable of vertically moving a pallet gripper downwardly to said gripping position for temporarily gripping said plurality of rotatable pallets which contained said at least one work-piece respectively, and the head being further capable of rotating the pallet gripper in a horizontal plane; (b) a tooling plate mounted to said head of said work-station; and (c) at least one processing tool mounted on said tooling plate for performing an operation on said at least one work-piece contained on said plurality of rotatable pallets respectively;

(d) whereby said conveyor pallet respectively moves said plurality of rotatable pallets to said gripping position, and said head moves said pallet gripper downwardly to said gripping position for temporarily gripping said plurality, of rotatable pallets from said plurality of rectangular pallets respectively such that said plurality of rotatable pallets can be rotated so that said at least one work-piece contained on said plurality of rotatable pallets is worked on by said at least one processing tool on said tooling plate.

Defined in more detail, the present invention is a method for processing work-pieces utilizing a work station which includes a pallet conveyor with a plurality of rectangular pallets and a plurality of rotatable pallets respectively placed on the plurality of rectangular pallets, the plurality of rotatable pallets each has a plurality of work-piece nests for retaining the work-pieces, the method comprising the steps of: (a) utilizing a head mounted above a gripping position and having a shaft with a wrist joint attached to a pallet gripper, the shaft being capable of vertically moving the pallet gripper downwardly to the gripping position for temporarily gripping said plurality of rotatable pallets, and the shaft further being capable of rotating the pallet gripper in a horizontal plane; (b) mounting a tooling plate to said head and located adjacent to and above said pallet gripper; (c) mounting a plurality of processing tools on said tooling plate for performing a plurality of different operations on said work-pieces contained on said plurality of rotatable pallets;

(d) moving said pallet conveyor so that said plurality of rotatable pallets are respectively positioned to said gripping position under said head;

(e) gripping a selected rotatable pallet which is under said head with said pallet gripper; (f) presenting a work-piece on said selected rotatable pallet to said plurality of processing tools; (g) performing a task on said work-piece;

(h) indexing said selected rotatable pallet to present another work-piece to said plurality of processing tools by rotating said pallet gripper on said shaft of head; and (i) repeating steps (f) through (h) sequentially for all of said plurality of work-pieces contained on said selected rotatable pallet.

Finally, the present invention can also be defined as a method for processing at least one work-piece utilizing a work station which includes a pallet conveyor with a plurality of pallets and a plurality of rotatable pallets respectively placed on the plurality of pallets, the method comprising the steps of: (a) utilizing a head having a wrist joint and a vertical shaft attached to a pallet gripper, the head being capable of vertically moving the pallet gripper downwardly to a gripping position for temporarily gripping said plurality of rotatable pallets respectively, and the head being capable of elevating and rotating the pallet gripper in a horizontal plane; (b) mounting a tooling plate to said head; (c) mounting at least one processing tool on said tooling plate; (d) moving said pallet conveyor so that said plurality of rotatable pallets are respectively positioned to said gripping position under said head;

(e) gripping a selected rotatable pallet which is under said head with said pallet gripper; (f) presenting said at least one work-piece on said selected rotatable pallet to said at least one processing tool; (g) performing a task on said at least one work-piece; and (h) repeating steps (d) through (g) sequentially for all of said plurality of rotatable pallet.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An apparatus for performing processing operations on at least one work-piece retained in a gripper holder and to be used in conjunction with a robot having a head capable of controlled X, Y, and Z movements, the gripper holder attached to the head, the apparatus comprising:

a. a tooling plate fixedly mounted to said head of said robot for retaining at least one processing tool to perform an operation on said at least one work-piece, where said at least one work-piece is positioned by said gripper holder of said head of said robot relative to the at least one processing tool; and b. means for mounting said at least one processing tool to said tooling plate.

2. An apparatus for performing processing operations on at least one work-piece, comprising:

a. a head capable of moving in X, Y, and Z directions and having a wrist joint attached to an end effector, where the head moves the wrist joint which moves the end effector vertically and rotating the end effector in a horizontal plane;

b. a tooling plate fixedly mounted to said head;

c. at least one processing tool mounted on said tooling plate for performing an operation on said at least one work-piece which is positioned by said end effector moving relative to the at least one processing tool; and d. a gripper holder attached to said end effector of said wrist joint of said head for temporarily gripping said at least one work-piece such that the gripper holder can rotate and move vertically so that said at least one work-piece is positioned relative to said at least one processing tool on said tooling plate.

3. An apparatus for performing processing operations on at least one work-piece retained by a gripper holder and to be used in conjunction with a robot having a head capable of controlled X, Y, and Z movements, the gripper holder attached to the head, the apparatus comprising:

a. a tooling plate fixedly mounted to said head of said robot;

b. at least one processing tool retained on said tooling plate for performing an operation on said at least one work-piece, where said at least one work-piece is positioned by said gripper holder relative to the at least one processing tool; and c. means for mounting said at least one processing tool to said tooling plate.

* * * * *